(12) United States Patent
Meyer et al.

(10) Patent No.: US 10,571,022 B2
(45) Date of Patent: Feb. 25, 2020

(54) SYSTEMS AND METHODS FOR DUAL CLUTCH TRANSMISSION CLUTCH ADAPTATION IN A HYBRID VEHICLE

(71) Applicant: Ford Global Technologies, LLC, Dearborn, MI (US)

(72) Inventors: Jason Meyer, Canton, MI (US); Matthew John Shelton, Grosse Ile, MI (US); Michael Glenn Fodor, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 15/890,295

(22) Filed: Feb. 6, 2018

(65) Prior Publication Data
US 2018/0245692 A1    Aug. 30, 2018

Related U.S. Application Data

(60) Provisional application No. 62/463,495, filed on Feb. 24, 2017.

(51) Int. Cl.
*B60W 50/00* (2006.01)
*F16H 61/664* (2006.01)
(Continued)

(52) U.S. Cl.
CPC ......... *F16H 61/6645* (2013.01); *B60K 6/387* (2013.01); *B60K 6/40* (2013.01); *B60K 6/48* (2013.01); *B60W 10/02* (2013.01); *B60W 50/0098* (2013.01); *F16H 61/0403* (2013.01); *B60K 2006/4825* (2013.01); *B60W 2050/0088* (2013.01); *B60Y 2200/92* (2013.01); *F16H 59/42* (2013.01); *F16H 59/46* (2013.01); *F16H 61/688* (2013.01); *F16H 63/502* (2013.01); *F16H 2059/366* (2013.01); *F16H 2061/0012* (2013.01); *F16H 2061/0422* (2013.01); *F16H 2063/025* (2013.01)

(58) Field of Classification Search
CPC ............ F16H 2500/50236; B60W 2050/0088
See application file for complete search history.

(56) References Cited

U.S. PATENT DOCUMENTS 7,131,932 B2 * 11/2006 Fahland .................. F16D 48/06
477/174
8,712,658 B2    4/2014 Holzer et al.
(Continued)

FOREIGN PATENT DOCUMENTS

DE    102011081193 A1 *  2/2013  ........... F16H 61/688

*Primary Examiner* — Sherry L Estremsky
(74) *Attorney, Agent, or Firm* — David Kelley; McCoy Russell LLP

(57) ABSTRACT

Methods and systems are provided for adapting a pressure to torque transfer function of a clutch of a dual clutch transmission. In one example, a method includes operating a first clutch of the dual clutch transmission at a selected capacity to change a speed of a first transmission input shaft to a desired speed, adjusting values of a torque transfer function of the first clutch based on a rate of the speed change, and maintaining driver demanded wheel torque during the adjusting via controlling torque output of an electric motor positioned in the driveline. In this way, the method may be used to adapt both positive and negative torque transfer functions.

20 Claims, 9 Drawing Sheets

(51) Int. Cl.
*F16H 61/04* (2006.01)
*B60K 6/40* (2007.10)
*B60K 6/387* (2007.10)
*B60K 6/48* (2007.10)
*B60W 10/02* (2006.01)
*F16H 61/00* (2006.01)
*F16H 63/02* (2006.01)
*F16H 59/42* (2006.01)
*F16H 63/50* (2006.01)
*F16H 59/46* (2006.01)
*F16H 61/688* (2006.01)
*F16H 59/36* (2006.01)

(56) References Cited

U.S. PATENT DOCUMENTS

2011/0153134 A1 6/2011 Rocq et al.
2013/0296123 A1 11/2013 Doering et al.
2016/0159362 A1 6/2016 Park et al.

\* cited by examiner

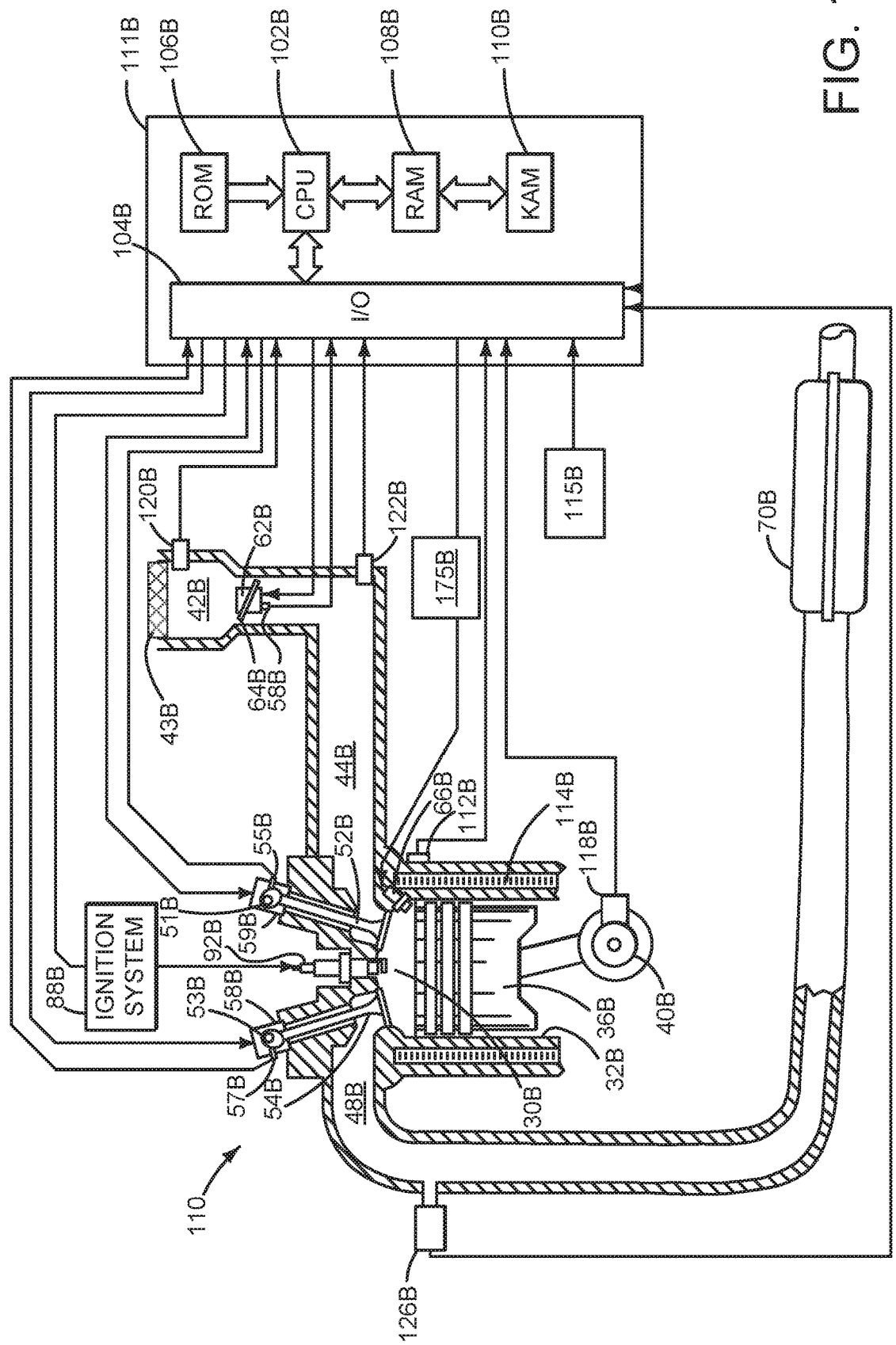

SYSTEMS AND METHODS FOR DUAL CLUTCH TRANSMISSION CLUTCH ADAPTATION IN A HYBRID VEHICLE

CROSS REFERENCE TO RELATED APPLICATION

The present application claims priority to U.S. Provisional Patent Application No. 62/463,495 entitled "SYSTEMS AND METHODS FOR DUAL CLUTCH TRANSMISSION CLUTCH ADAPTATION IN A HYBRID VEHICLE," filed on Feb. 24, 2017. The entire contents of the above-referenced application are hereby incorporated by reference in its entirety for all purposes.

FIELD

The present description relates generally to methods and systems for adapting clutch capacity in a vehicle including a dual clutch transmission and an electric machine positioned downstream of the dual clutch transmission.

BACKGROUND/SUMMARY

Dual clutch transmissions are a type of transmission employing two input clutches which connect a pair of input shafts to the prime mover, typically an internal combustion engine. One clutch is used for odd numbered gears, and the other clutch is used for even numbered gears. Synchronizers establish power flow paths between the input shafts and the transmission output. While the vehicle is driving in an odd numbered gear, the synchronizers for the even numbered gears may be manipulated to select the next higher or lower gear ratio, and vice versa.

For any dual clutch transmission, the ability to precisely actuate clutch capacity is important for drivability and shift quality. For a hybrid powertrain with two input clutches for engine connection and disconnection to the transmission, it is important to be able to restart the engine and connect the disconnect clutch smoothly and quickly when engine operation is desired, to provide vehicle operator requested torque and acceleration. Similarly, during gear shift events, accurate knowledge of clutch capacity is important for smooth transitions from one gear ratio to another. Part-to-part variability and change over time are significant noise factors for clutch capacity control and estimation.

Typically, vehicles with a dual clutch transmission are controlled to find opportunities for clutch adaptation during transient operation, usually in non-intrusive schemes. Most of these schemes adapt while the clutch is transmitting positive torque to the wheels, but the clutch transfer function for both positive and negative slip/torque is important for consistent operation and shift quality. For a vehicle comprising powertrain components including a belt integrated starter/generator (BISG) or a crank integrated starter/generator (crank ISG), and an electric machine positioned in the driveline downstream of a dual clutch transmission, opportunities for clutch adaptation may occur less frequently. However, a vehicle with such an architecture may provide increased flexibility in how torque is delivered to the wheels, and may further provide unique opportunities to perform clutch adaptation as compared to a non-hybridized vehicle.

The inventors herein have recognized these issues, and have developed systems and methods to address the above issues. In one example, a driveline operating method for a vehicle is provided comprising operating a first clutch of a dual clutch transmission at a selected capacity to change a speed of a first transmission input shaft to a desired speed, adjusting values of a torque transfer function of the first clutch based on a rate of the speed change, and maintaining driver demanded wheel torque during the adjusting via controlling torque output of an electric motor positioned in the driveline. In this way, clutch capacity may be utilized to control speed of the first input shaft such that values of a torque transfer function may be adjusted, while maintaining driver demanded wheel torque.

As one example, changing speed of the first transmission input shaft to the desired speed includes decreasing speed of the first transmission input shaft to the desired speed responsive to transmission input shaft speed being greater than the desired speed, and further responsive to a speed of a combustion engine positioned upstream of the transmission being lower than the desired speed. In another example, changing speed of the first input shaft to the desired speed includes increasing speed of the transmission input shaft to the desired speed responsive to transmission input shaft speed being lower than the desired speed, and further responsive to engine speed being greater than the desired speed.

In this way, a pressure to torque transfer function may be adapted under conditions where the first input shaft is either increased to a desired speed, or decreased to a desired speed. Accordingly, both positive and negative torque transfer functions may be adapted according to the systems and methods depicted herein.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1B is a sketch of an engine of the hybrid vehicle driveline;

DETAILED DESCRIPTION

The following description relates to systems and methods for dual clutch transmission clutch adaptation procedures. FIGS. 1A-3 show an example hybrid vehicle system that includes a driveline with an engine, an integrated starter/generator, a dual clutch transmission (DCT), and an electric machine that is positioned downstream of the dual clutch transmission. In certain conditions, for example when a speed of a non-active (e.g. not transferring torque to vehicle wheels) input shaft of the dual clutch transmission is greater than a desired speed, and when both non-active shaft speed and desired speed are greater than engine speed, a negative torque transfer function may be adapted. FIG. 4A depicts an example state of a dual clutch transmission for which the negative torque transfer function may be adapted. Alternatively, under another set of conditions, for example when a speed of a non-active input shaft is less than a desired speed, and when both the speed of the non-active input shaft and the desired speed are lower than engine speed, a positive torque transfer function may be adapted. FIG. 4B depicts an example state of a dual clutch transmission for which the positive torque transfer function may be adapted.

Figure 5:
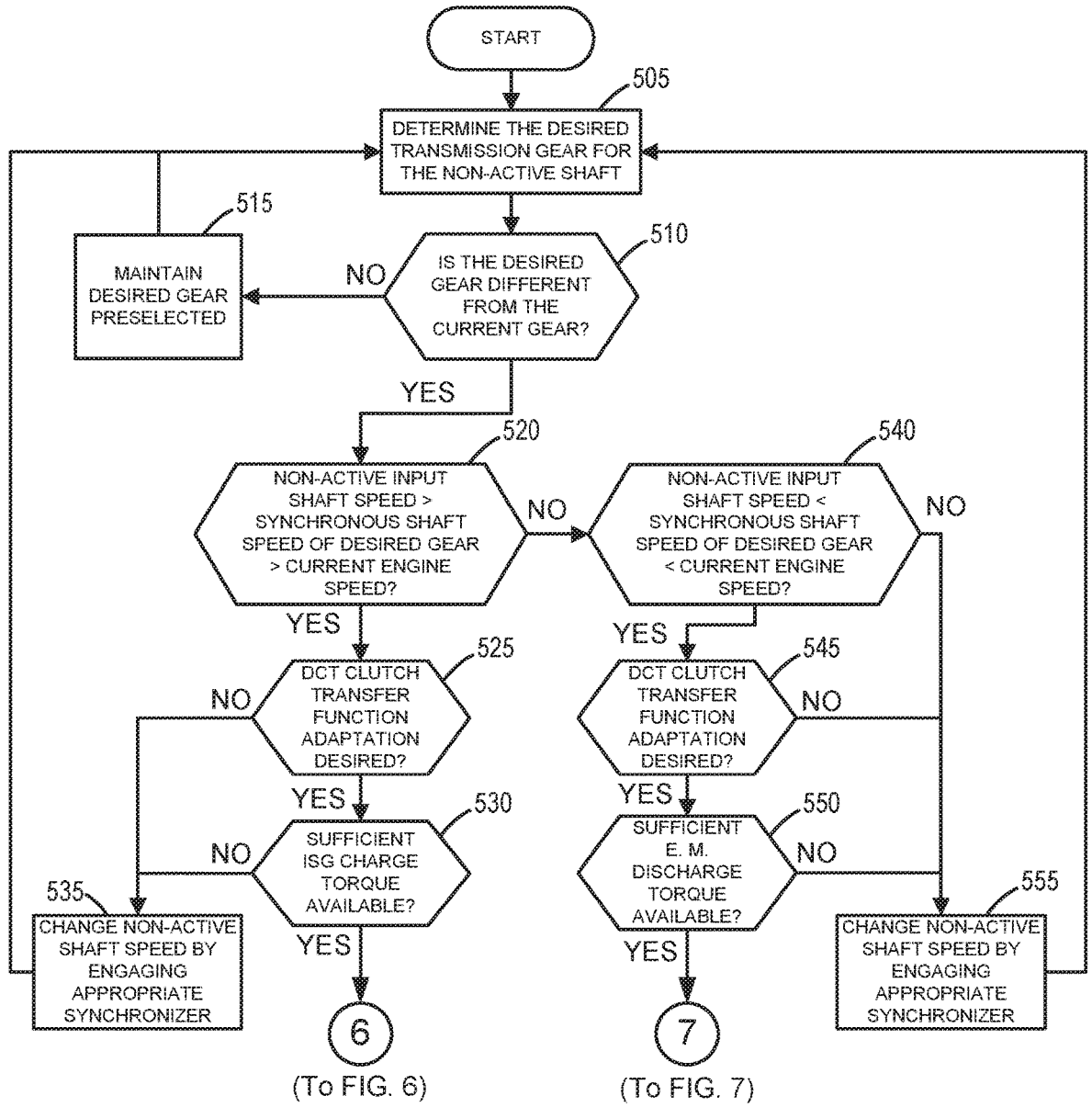
FIG. 5 shows a high-level example method for conducting a clutch adaptation procedure.
Figure 6:
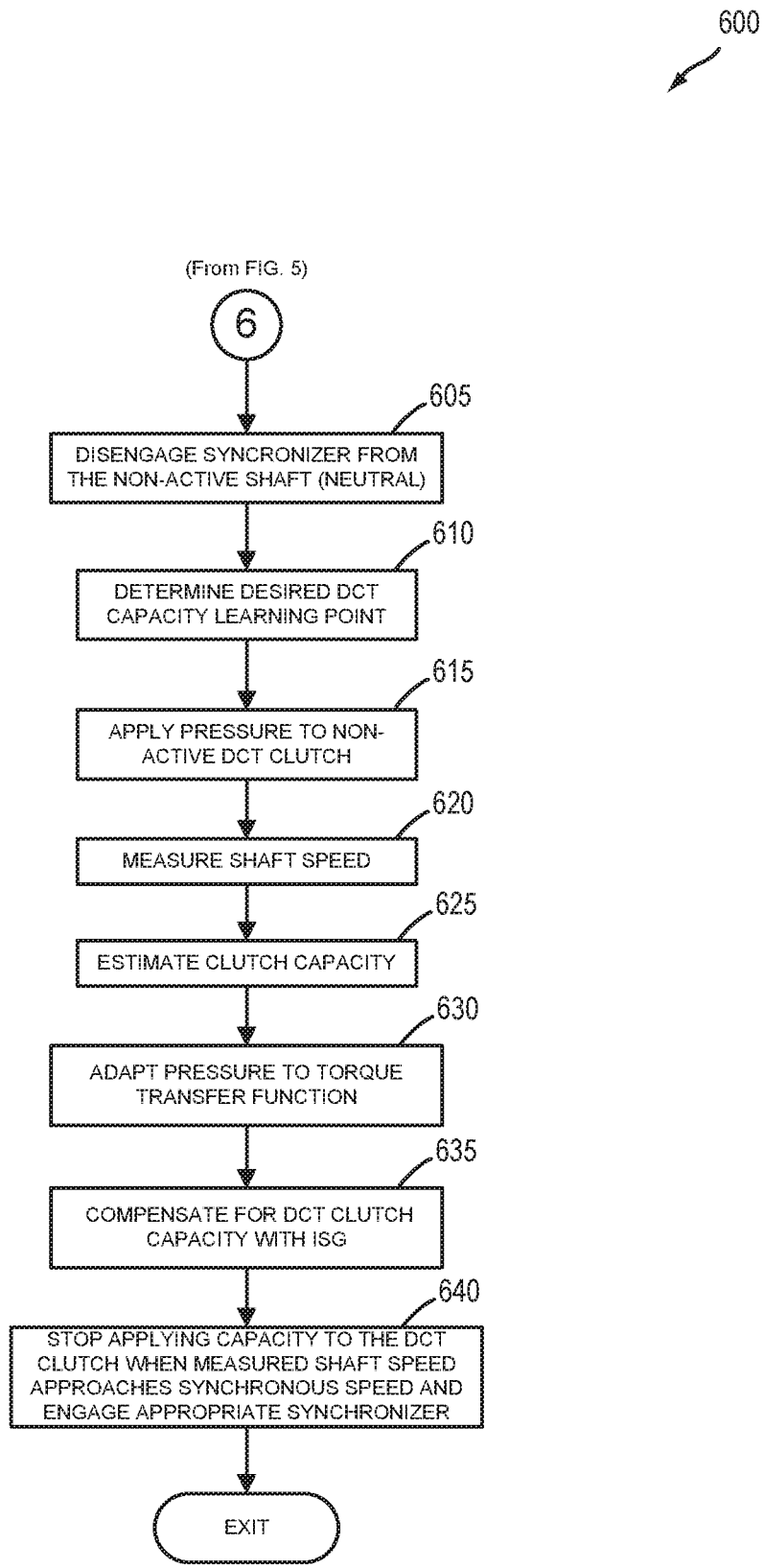
FIG. 6 continues from FIG. 5 and shows a high-level example method for conducting a negative clutch adaptation procedure.
Figure 7:
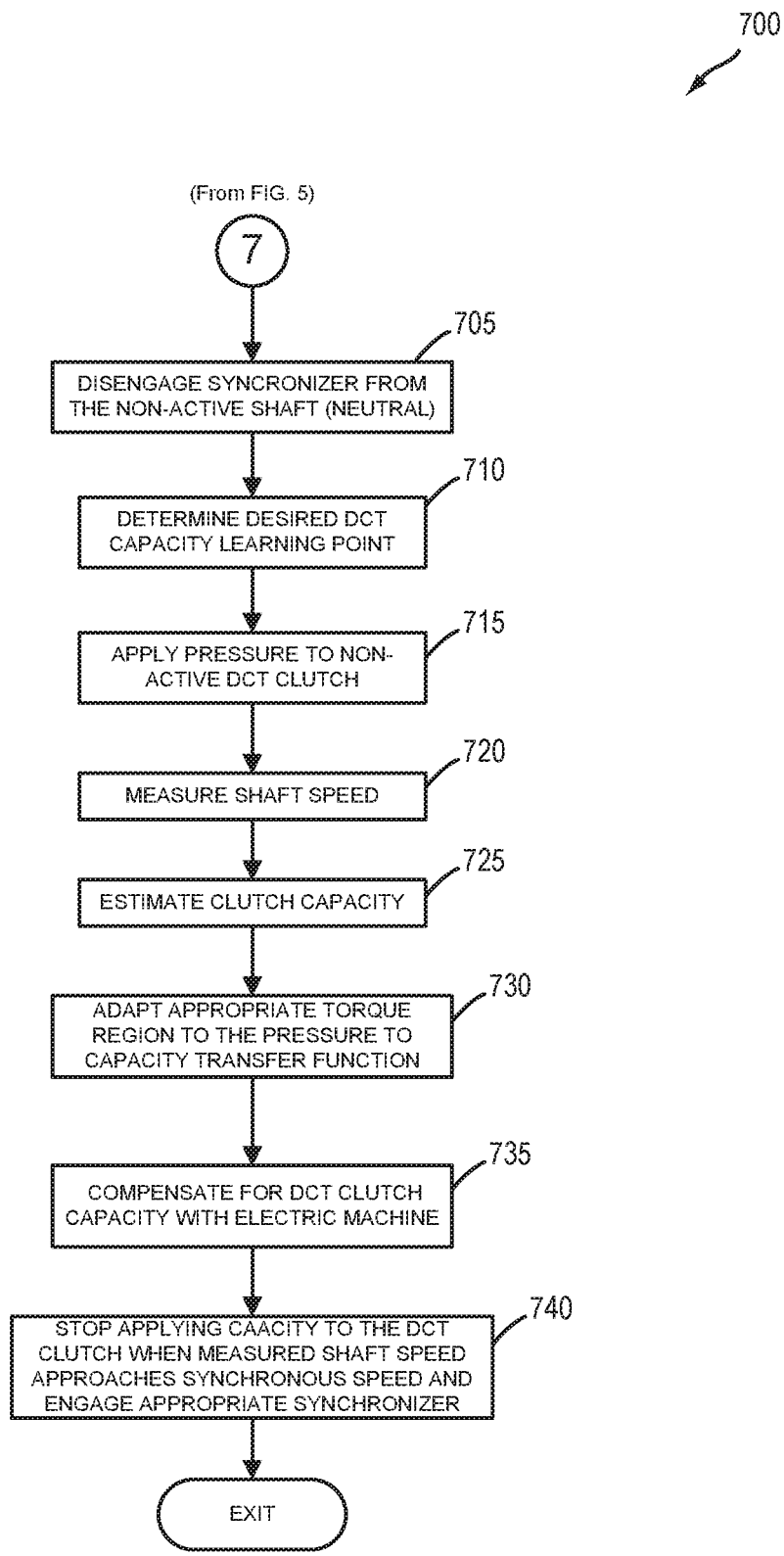
FIG. 7 continues from FIG. 6 and shows a high-level example method for conducting a positive clutch adaptation procedure.
Figure 8:
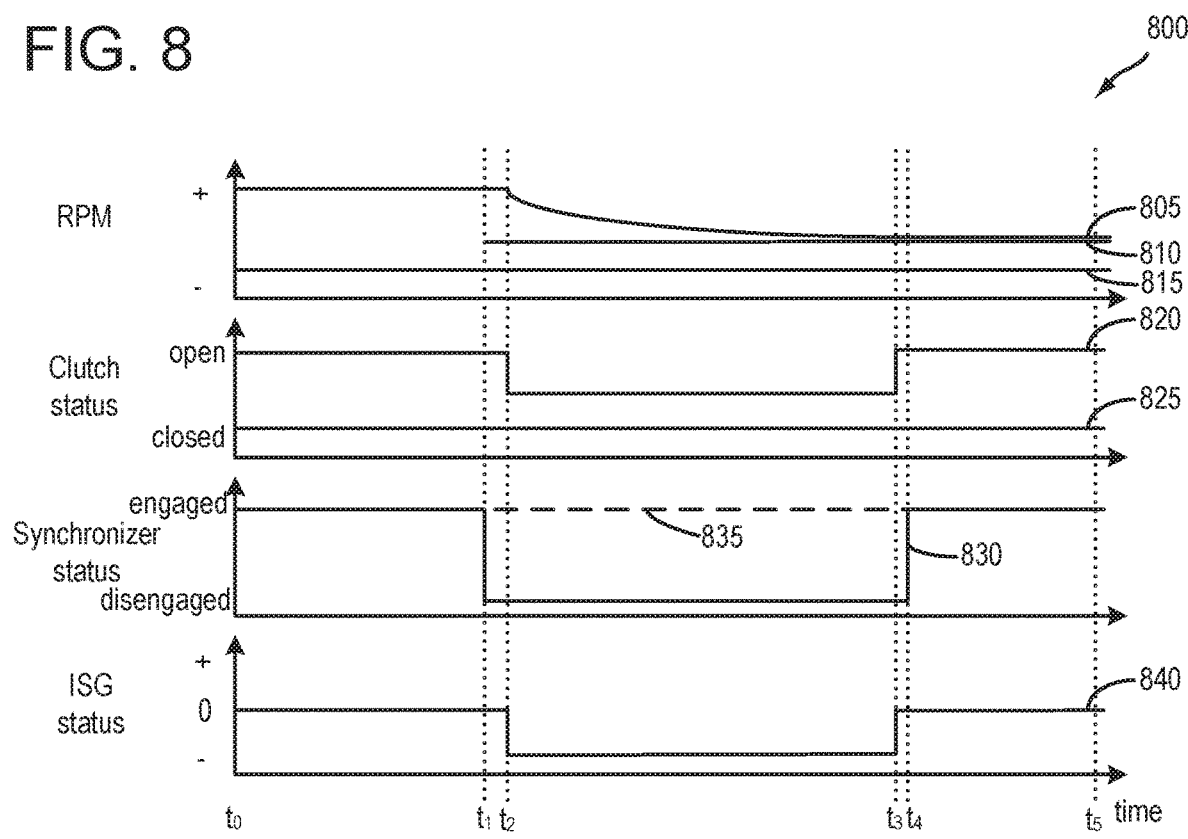
FIG. 8 shows an example timeline for conducting a negative clutch adaptation procedure, according to the methods depicted at FIGS. 5-6.
Figure 9:
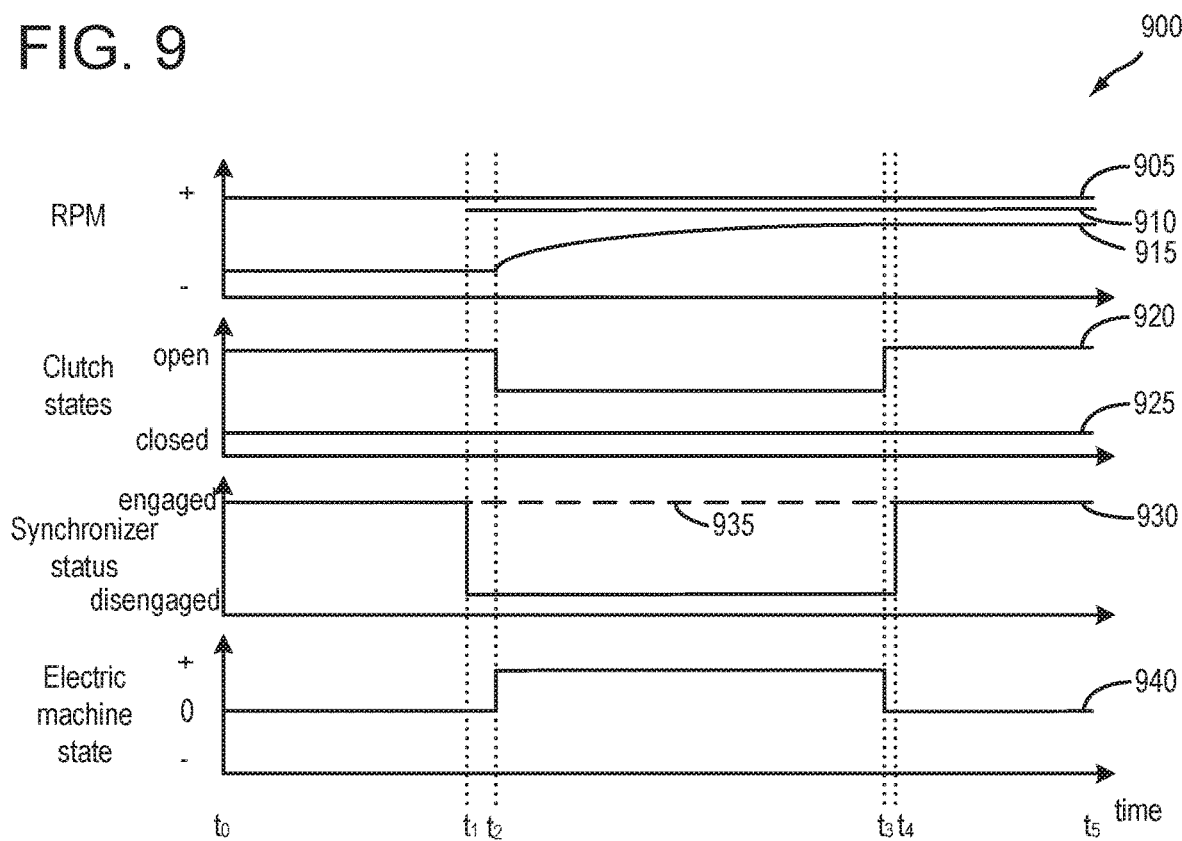
FIG. 9 shows an example timeline for conducting a positive clutch adaptation procedure, according to the methods depicted at FIGS. 5-7.

A method for determining whether conditions are appropriate for conducting either a positive or negative DCT clutch adaptation procedure, is illustrated at FIG. 5. If it is indicated that the speed of the non-active input shaft of the dual clutch transmission is greater than the desired speed, and that both non-active shaft speed and desired speed are greater than engine speed, the negative torque transfer function may be adapted, as illustrated at FIG. 6. Alternatively, if it is indicated that the speed of the non-active input shaft is less than the desired speed, and that both the speed of the non-active input shaft and the desired speed are lower than engine speed, the positive torque transfer function may be adapted, as illustrated at FIG. 7. FIG. 8 shows an example timeline for conducting a negative DCT clutch adaptation procedure, and FIG. 9 shows an example timeline for conducting a positive DCT clutch adaptation procedure.

Figure 1A:
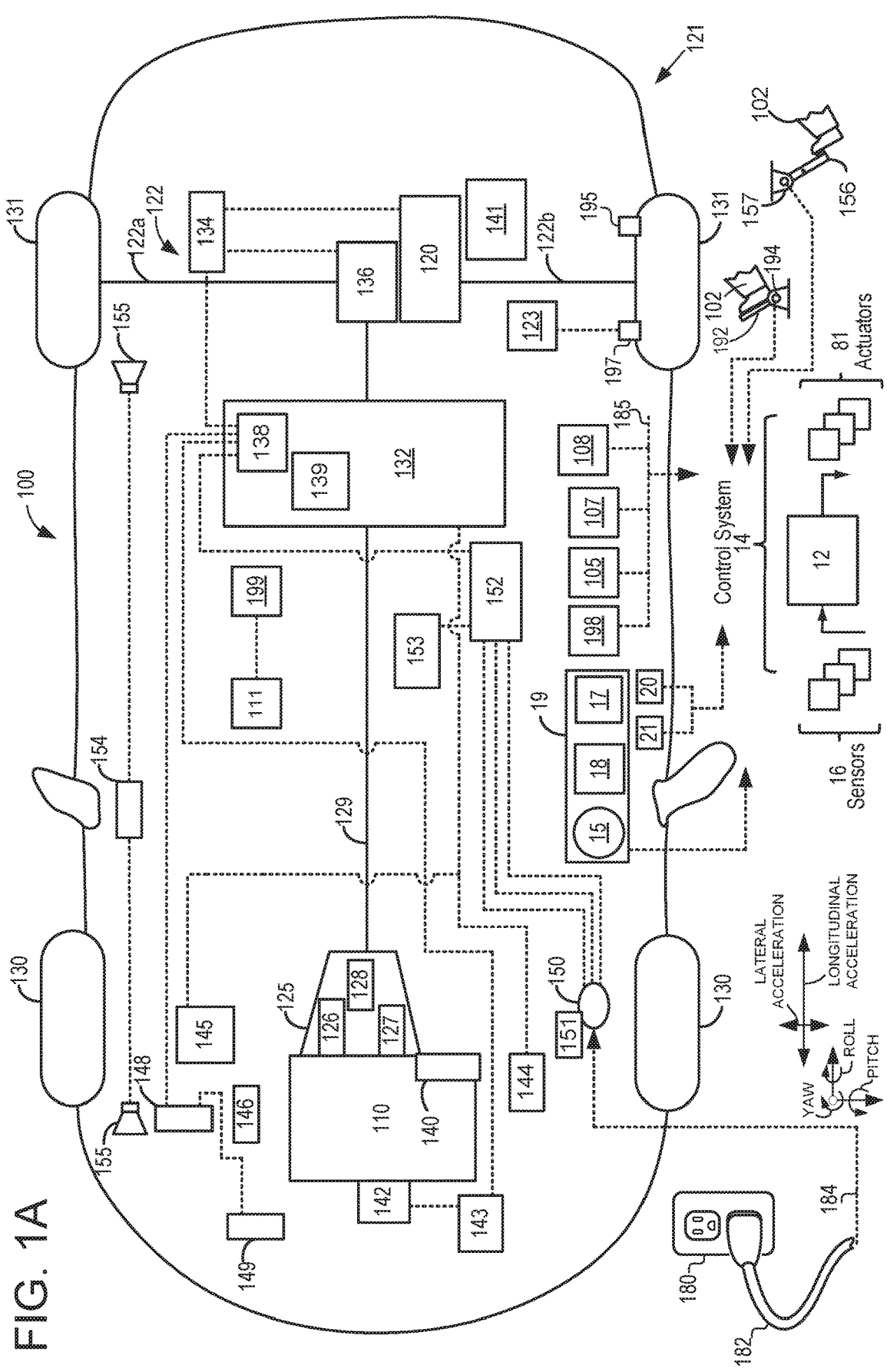
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and transmission 125, via which the rear axle 122 may be driven. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set and one or more clutches to decouple transmission 125 and electric machine 120 from wheels 131.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 3, transmission 125 may shift gears by selectively opening and closing first clutch 126 and second clutch 127.

Electric machine 120 may receive electrical power from onboard energy storage device 132. Furthermore, electric machine 120 may provide a generator function to convert engine output or the vehicle's kinetic energy into electrical energy, where the electrical energy may be stored at energy storage device 132 for later use by the electric machine 120 or integrated starter/generator 142. A first inverter system controller (ISC1) 134 may convert alternating current generated by electric machine 120 to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 132 may include one or more batteries and/or capacitors.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system or anti-skid braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIGS. 1B-3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 10. Rather, the passive key may be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
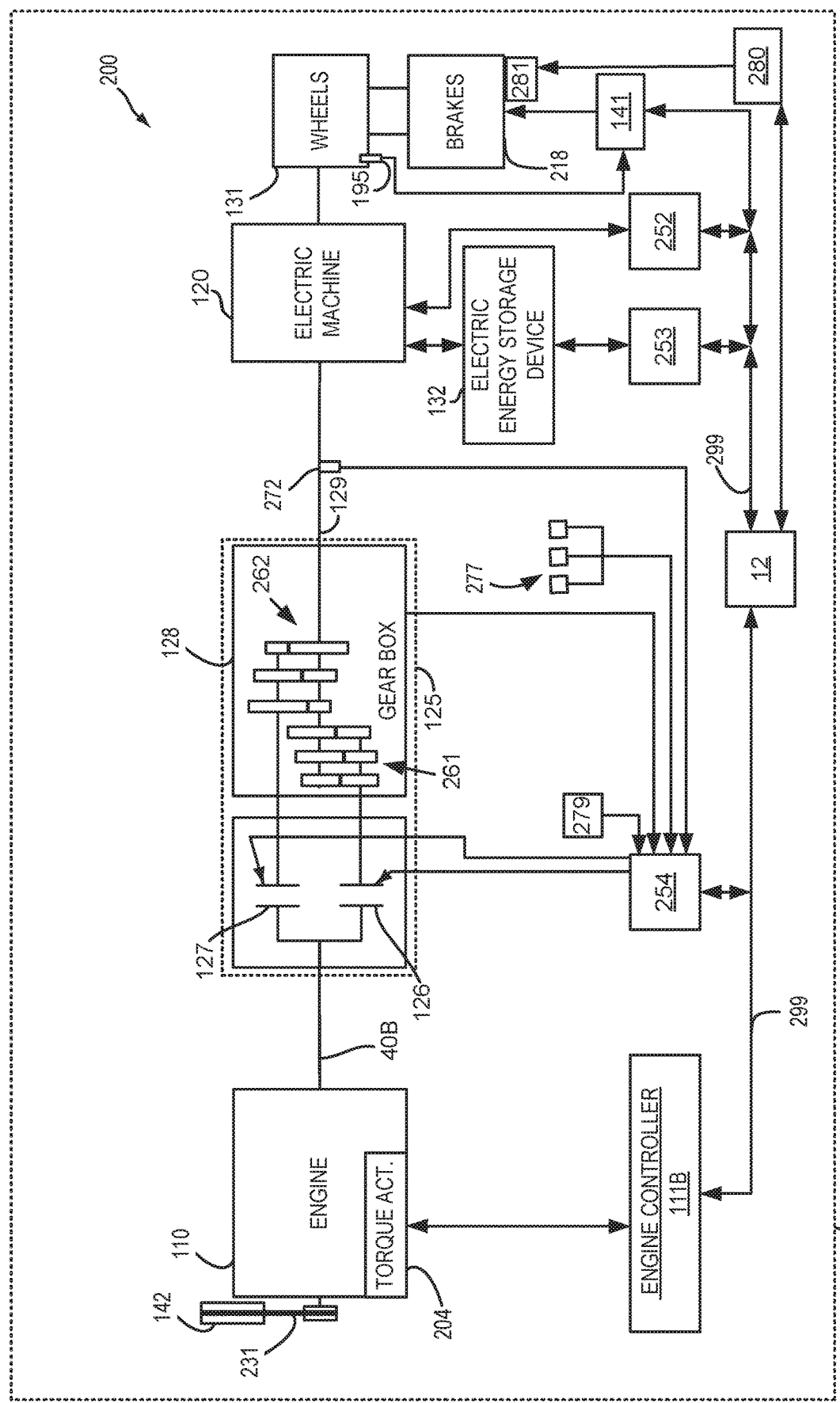
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIGS. 1A-1B. Other components of FIG. 2 that are common with FIG. 1A are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), toque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft 40B or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125. In some examples, there are no other driveline clutches or disconnect devices other than those shown in FIG. 2. However, in other examples, additional clutches or disconnect devices may be added, if desired.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, first input shaft speed sensor(s), second input shaft speed sensor(s), and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Figure 3:
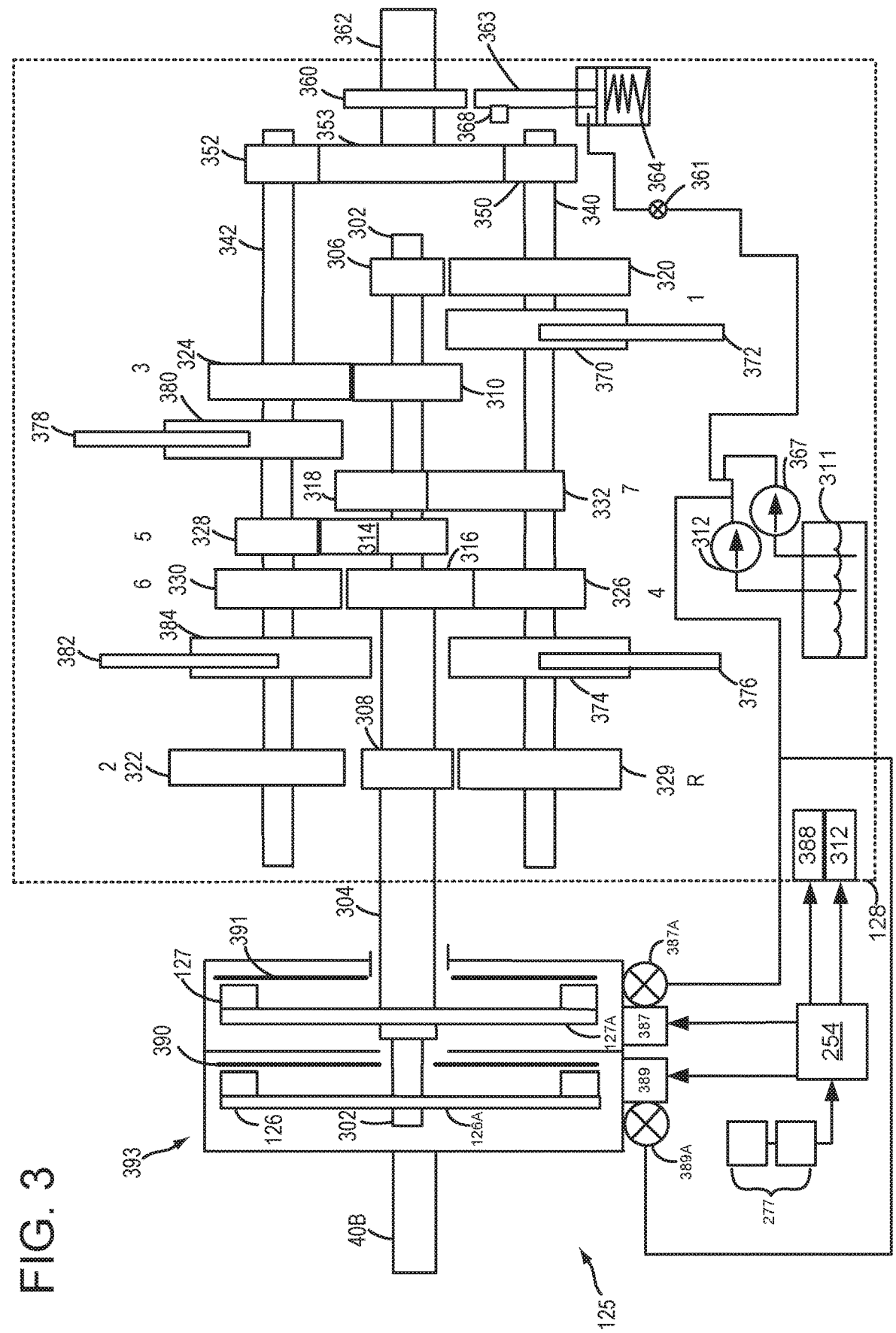
FIG. 3 is a schematic diagram of a dual clutch transmission located in the hybrid vehicle driveline.
Figure 4A:
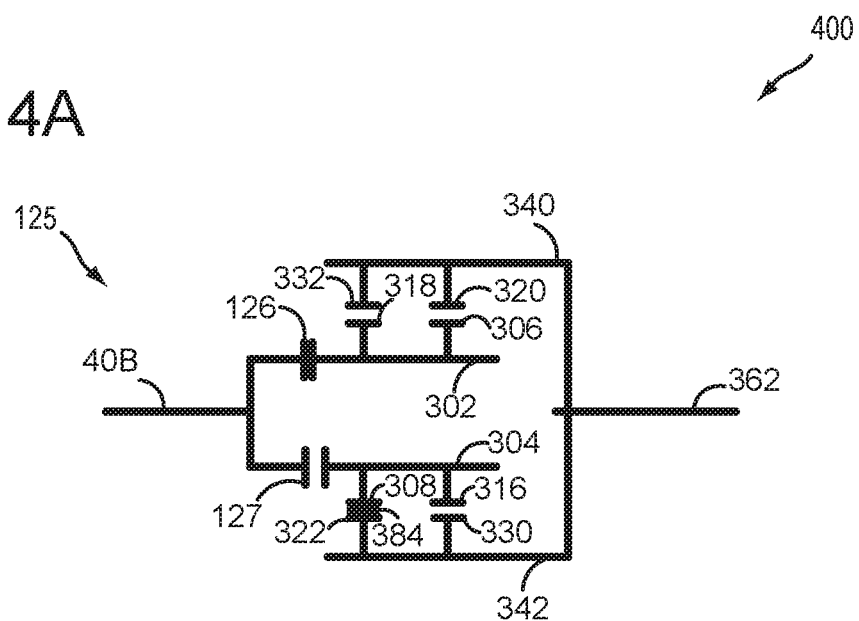
FIG. 4A depicts an example illustration of a dual clutch transmission configuration for conducting a negative dual clutch transmission clutch adaptation procedure.
Figure 4B:
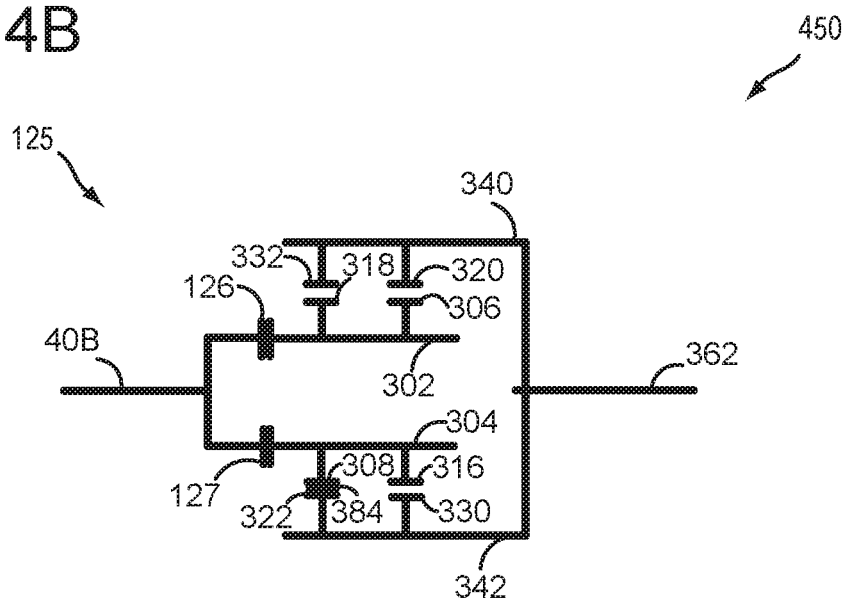
FIG. 4B depicts an example illustration of a dual clutch transmission configuration for conducting a positive dual clutch transmission clutch adaptation procedure.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 328, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 329, and may further include fourth fixed gear 316, for receiving either fourth gear 326 or sixth gear 330. Accordingly, the dual clutch transmission may simultaneously have engaged two different gear ratios (e.g. first gear 320 received via first fixed gear 306, and second gear 322 received by second fixed gear 308).

It may be understood that both first transmission input shaft 302 and second transmission input shaft 304 may be connected to each of first clutch 126 and second clutch 127 via spines (not shown) on the outside of each shaft, respectively. In a normal resting state, each of first clutch 126 and second clutch 127 are held open (e.g. fully open), for example via springs (not shown), etc., such that no torque from engine (e.g. 110) may be transmitted to first transmission input shaft 302 or second transmission input shaft 304 when each of the respective clutches are in a fully open state. Responsive to closing first clutch 126, engine torque may be transmitted to first transmission input shaft 302, and responsive to closing second clutch 127, engine torque may be transmitted to second transmission input shaft 304. In some examples, during normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 328, and reverse gear 329. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 328, sixth gear 330, seventh gear 332, and reverse gear 329 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 384. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 382 may be utilized to lock either second gear 322 or sixth gear 330. Third synchronizer 380 may be utilized to lock either third gear 324 or fifth gear 328. Fourth synchronizer 374 may be utilized to lock either fourth gear 326, or reverse gear 329. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. In some examples, first clutch actuator 389 may control a first clutch valve 389A, and second clutch actuator 387 may control a second clutch valve 387A. For example, both first clutch valve 389A and second clutch valve 387A may comprise pressure control valves. Both first clutch valve 389A and second clutch valve 387A may control fluid flow supplied from transmission pump 312, for example, to control opening and closing of first clutch 126 and second clutch 127, respectively. In some examples, TCM 254 may control transmission pump.

TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor, which may be utilized by the TCM to detect position of selector forks (e.g. 372, 376, 378, 382).

DCT 125 may be understood to function as described herein. For example, when first clutch 126 is actuated closed, engine torque may be supplied to first transmission input shaft 302. When first clutch 126 is closed, in some examples it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first layshaft 340), the other layshaft (e.g. second layshaft shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 370, and wherein first clutch 126 is closed (and second clutch 127 is open), power may be transmitted from the engine to first input shaft 302, and to first layshaft 340. While first gear 320 is engaged, second gear 322 may simultaneously be locked via fourth synchronizer 384. Because second gear 322 is locked, this may rotate second input shaft 304, where the second input shaft 304 is speed matched to the vehicle speed in second gear. In an alternative case where a gear is pre-selected on the other layshaft (e.g. second layshaft 442), that layshaft will also rotate as it is driven by output shaft 362 and pinion 352.

When a gear shift is initiated by TCM 254, only the clutches may be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 125 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Thus, discussed herein, a dual clutch transmission (DCT) may comprise a transmission that uses two separate clutches for odd and even gear sets. One clutch (e.g. 126) is utilized to transfer engine torque to one input shaft (e.g. 302), while a separate clutch (e.g. 127) is utilized to transfer engine torque to a separate input shaft (e.g. 304). The dual clutch transmission receives engine torque via an engine crankshaft (e.g. 40B), and outputs torque via an output shaft (e.g. 362).

The vehicle architecture discussed herein enables non-intrusive opportunities to perform DCT clutch (e.g. 126, 127) adaptation. In other words, there may be opportunities for estimating a capacity generated by the DCT clutches, and adapting a DCT pressure to torque transfer function. As discussed above, DCT pressure may be regulated via control over an amount or rate of fluid supplied to either first clutch (e.g. 126) or second clutch (e.g. 127), via a first clutch valve (e.g. 389A), and a second clutch valve (e.g. 387A), respectively.

More specifically, in a non-hybrid vehicle with a DCT, the non-active input shaft (e.g. input shaft with respective clutch open) is typically either one gear higher or lower than the active input shaft (e.g. input shaft with respective clutch at least partially closed, thus transferring transmission assembly input torque through the transmission), and the non-active input shaft is only shifted to select a new target gear. However, in a vehicle with the architecture discussed above with regard to FIGS. 1A-3, the non-active input shaft may be shifted more frequently, and in some cases the shifts may be large (e.g. $7^{th}$ gear to $3^{rd}$ gear). Additionally, because the driveline includes an electric machine (e.g. 120) positioned downstream of the DCT, any disturbances in the transmission resulting from gear shift events may be compensated for via the electric machine. Thus, such large shift events may comprise opportunities to adapt the non-active clutch. As an example, instead of using synchronizers (e.g. 370, 374, 378, 382) to change a speed of a non-active shaft, capacity may be applied to the DCT clutch to the non-active shaft in certain situations to change the speed of the non-active input shaft. By observing the rate (e.g. change in RPM per unit time) of change of the input shaft speed, it may be possible to accurately estimate the capacity generated by the DCT clutch corresponding to the non-active input shaft, and adapt the DCT pressure to torque transfer function. Such a process may be utilized to adapt both the positive and negative torque transfer functions.

Turning to FIG. 4A, a schematic depiction 400 illustrating clutch states for adapting a negative torque transfer function of a non-active DCT clutch, is shown. Illustrated is a simplified depiction of DCT 125, discussed at FIG. 1A, and FIGS. 2-3. Components that are the same as those depicted in FIG. 1A, and FIGS. 2-3, are depicted with the same numerals, however, not all components of the DCT depicted in FIG. 1A, and FIGS. 2-3 are illustrated, for clarity.

A vehicle with the architecture depicted above at FIGS. 1A-3 may be operated in an electric-only mode of operation, where the crankshaft 40B is not spinning. In other words, while in electric-only mode, both the first clutch (e.g. 126) and second clutch (e.g. 127) may be understood to be in open configurations. In such a mode of operation, torque ratios of the DCT input shafts (e.g. 302, 304) may not affect the torque gain of the electric machine (e.g. 120) positioned downstream of the transmission. However, prepositioning the DCT into a high gear (e.g. $6^{th}$ gear 330), and a desired gear (e.g. $1^{st}$ gear 320) may improve engine start performance. As the vehicle is driven in electric-only mode, the desired gear may change and thus large changes in input shaft speed (e.g. $1^{st}$ gear 320 to $7^{th}$ gear 332, and $6^{th}$ gear 330 to $2^{nd}$ gear 322) may be demanded. Such an opportunity may provide a non-intrusive opportunity to adapt the negative torque transfer function of the DCT clutch corresponding to the input shaft that is changing speed from the first gear (e.g. 320) to the seventh gear (e.g. 332).

In such an example, odd shaft synchronizers (not shown at FIG. 4A) may be disengaged to create a neutral state. More specifically, an odd shaft synchronizer (e.g. 370) may be disengaged from the first gear (e.g. 320). Thus, depicted at FIG. 4A, it may be understood that first gear 320 and seventh gear 332 are in a neutral state, with the odd shaft synchronizers (not shown), not engaging either the first gear or the seventh gear. However, it may be understood that just prior to disengaging the odd shaft synchronizers, the first gear was engaged during electric-only mode. Furthermore, depicted at FIG. 4A, second gear 322 is illustrated to be engaged with second fixed gear 308, via fourth synchronizer 384. Thus, it may be understood that the sixth gear 330 was engaged during electric-only mode, prior to the fourth synchronizer 384 disengaging the sixth gear 330 and engaging the second gear 322. Furthermore, second clutch 127 is depicted as open. In such an example with the odd gears in a neutral state (e.g. appropriate synchronizers not engaged), and with the second clutch 127 open, capacity may be commanded to the first clutch 126 to pull the odd input shaft (e.g. 302) speed from the first gear synchronous speed down to the seventh gear synchronous speed. Thus, FIG. 4A illustrates the clutch states for such an example, where the second clutch 127 is open, the second gear 322 is engaged via synchronizer 384, and capacity is applied to first clutch 126).

Applying capacity via the first clutch 126 may result in positive torque being transmitted to the engine (e.g. 110), however in a case where the engine is off, sufficient torque may not be available from the decelerating odd input shaft (e.g. 302) to overcome engine compression and crank the engine. Thus, in such an example, compensation for the positive torque transmitted to the engine may not be demanded. Alternatively, in a case where the engine is in operation (e.g. combusting air and fuel), then a positive torque may be transmitted to the engine which may serve to accelerate the engine. In a case where the engine is in operation and the second input clutch (e.g. 127) is at least partially closed, then compensation for the positive torque transmitted to the engine may be demanded. In such a case, an ISG (e.g. 142) upstream of the dual clutch transmission may be commanded to supply a negative torque to offset the positive torque, such that a driver-demanded wheel torque may be maintained.

In the example depiction illustrated at FIG. 4A, just before the synchronous seventh gear (e.g. 332) speed is reached, capacity via the first clutch 126 may be reduced to zero (e.g. fully open), and the appropriate synchronizer (e.g. 370, not shown at FIG. 4A) may be engaged to finish the gear change. Using such a strategy of pulling down input shaft speed from a first gear synchronous speed to a seventh gear synchronous speed via commanding clutch capacity, the pressure to torque transfer function may be adapted, as will be discussed in further detail below with regard to the methods depicted at FIGS. 5-6. While such an example depicted at FIG. 4A discusses a condition where the vehicle is operated in an electric-only mode of operation prior to the desired gear change from first gear to seventh gear, such a procedure may be utilized any time initial input shaft speed is higher than a desired input shaft speed, and wherein both initial input shaft speed and desired input shaft speed are greater than engine speed.

While the example illustration depicted at FIG. 4A discusses how a negative torque transfer function may be adapted, turning now to FIG. 4B, an example illustration 450 is depicted for adapting a positive torque transfer function of a non-active DCT clutch. As discussed above with regard to FIG. 4A, illustration 450 is a simplified depiction of DCT 125, discussed at FIG. 1A, and FIGS. 2-3. Components that are the same as those depicted in FIG. 1A, and FIGS. 2-4A, are depicted with the same numerals, however, similar to FIG. 4A, not all components of the DCT depicted in FIG. 1A, and FIGS. 2-3 are illustrated, for clarity.

During an engine start event for a vehicle equipped with a DCT, and with the architecture depicted above at FIGS. 1A-3, it may be desirable to have the transmission in a high gear (e.g. $7^{th}$ gear 332), and the desired low gear (e.g. $2^{nd}$ gear 322). Such a configuration may enable torque to be transmitted to the driveline via the high gear shaft (e.g. 302) while the engine is running up to the synchronous speed of the desired gear shaft. Once the engine is connected to the desired low gear shaft, it may no longer be useful to have the non-active shaft at the high gear (e.g. $7^{th}$ gear 332), and a lower gear may be desired for the non-active shaft. Typically, this may involve a gear shift from seventh gear to third gear (e.g. 324) (not shown in FIG. 4B). Thus, for switching gears from seventh gear to third gear, speed of the odd gear input shaft 302 may be increased to the third gear synchronous speed. Such a situation may present an opportunity to non-intrusively adapt the positive torque transfer function of the DCT clutch (e.g. 126) associated with the odd shaft.

Thus, FIG. 4B illustrates an example where second gear (e.g. 322) is engaged via its respective synchronizer (e.g. $4^{th}$ synchronizer 384), and it is desired to change gears from seventh gear 332 to third gear (e.g. 324). Furthermore, as illustrated at FIG. 4B, second clutch 127 is at least partially closed, thus it may be understood that transmission assembly input torque is being transferred through the transmission via the second clutch, and via the second gear. In such an example, the odd shaft synchronizers (not shown in FIG.

4B) may be disengaged to create a neutral state. Thus, it may be understood that all odd gears are disengaged, although only seventh gear 332 and first gear 320 are illustrated at FIG. 4B.

Responsive to disengaging the odd shaft synchronizers, capacity may be applied to the first clutch 126, in order to increase the first input shaft 302 speed to the third gear synchronous speed. FIG. 4B specifically depicts such an example where the odd gears are in a neutral state, the second clutch 127 is transferring engine torque through the transmission via the second gear 322 (where second gear is synchronized via fourth synchronizer 384), and where capacity is applied to the first clutch 126 to pull up the speed of the first input shaft 302 to the third gear synchronous speed.

Applying capacity to the first clutch 126 may result in a negative torque being transmitted to the wheels, as a result of the second input shaft 304 being connected. However, to compensate for the negative torque, the electric machine (e.g. 120) positioned downstream of the transmission may be utilized, where the electric machine may produce positive torque proportional to either the commanded clutch capacity, or measured inertial torque.

In such an example, just before the third gear synchronous speed is reached for the odd input shaft (e.g. first input shaft 302), first clutch (e.g. 126) capacity may be reduced to zero torque (e.g. fully open), and the appropriate synchronizer (e.g. 380, not shown in FIG. 4B) may be utilized to engage the third gear. Using such a strategy of pulling up input shaft (e.g. 302) speed from a seventh gear synchronous speed to a third gear synchronous speed via commanding clutch (e.g. 126) capacity, the pressure to torque transfer function may be adapted, as will be discussed in further detail below with regard to the methods depicted at FIG. 5 and FIG. 7. While such an example depicted at FIG. 4B discusses an engine start condition where a low gear (e.g. $2^{nd}$ gear 322) and a high gear (e.g. $7^{th}$ gear 332) are engaged, and a gear shift from the high gear to a lower gear (e.g. third gear 324) is desired, it may be understood that the same such procedure may be applied any time initial input shaft speed is lower than a desired input shaft speed, and where both initial input shaft speed and desired input shaft speed are lower than the engine speed.

Turning now to FIG. 5, a high level example method 500 for conducting a clutch adaptation procedure, is shown. More specifically, method 500 may include determining whether a desired input shaft speed for a non-active (e.g. not transferring transmission input torque to vehicle wheels) input shaft is greater than, or less than a current, or initial, non-active input shaft speed, and whether engine speed is greater than, or less than, both non-active input shaft speed and desired non-active input shaft speed. In a case where desired input shaft speed for the non-active input shaft is lower than initial input shaft speed, and where both are greater than engine speed, a negative torque transfer function may be adapted. Alternatively, in a case where desired input shaft speed for a non-active input shaft is greater than initial input shaft speed, and where both are less than engine speed, a positive torque transfer function may be adapted.

Method 500 will be described with reference to the systems described herein and shown in FIGS. 1A-3, though it should be understood that similar methods may be applied to other systems without departing from the scope of this disclosure. Method 500 may be carried out by a controller, such as controller 12 in FIG. 1A, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as ISG (e.g. 142), electric machine (e.g. 120), engine torque actuator(s) (e.g. 204), selector forks (e.g. 372, 376, 378, 382), first clutch actuator (e.g. 389), second clutch actuator (e.g. 387), etc., according to the method depicted below.

Method 500 begins at 505 and may include determining a desired gear for a non-active input shaft, where the non-active input shaft may comprise an input shaft with the clutch fully open, while the other clutch may be transferring engine torque through the transmission. Briefly, as discussed above, in some examples a seventh gear (e.g. 332) may be engaged, or selected, via the appropriate synchronizer (e.g. 370), but a desired gear may be a lower gear, such as third gear (e.g. 324). In another example, a lower gear, such as first gear (e.g. 320) may be engaged, or selected, via the appropriate synchronizer (e.g. 370), but a desired gear may be a higher gear, such as seventh gear (e.g. 332). Such examples are meant to be illustrative. Accordingly, at 505, method 500 includes determining the desired transmission gear for the non-active input shaft. The desired gear may be a function of a positive of an accelerator pedal (e.g. 192), for example. The desired gear may further be a function of engine RPM, and load, for example.

Proceeding to 510, method 500 may include determining whether the desired gear is different from the gear that is selected, or engaged, on the non-active input shaft. If, at 510, it is indicated that the gear that is selected is not different from the desired gear, method 500 may proceed to 515, and may include maintaining the desired gear preselected on the non-active shaft via the appropriate synchronizer.

Returning to 510, responsive to an indication that the desired gear is different from the current gear that is selected on the non-active shaft, method 500 may proceed to 520. At 520, method 500 may include determining whether a current speed of the non-active input shaft is greater than a synchronous speed of the desired gear, and may further include determining whether engine speed is less than both the current speed of the non-active input shaft and the synchronous speed of the desired gear. At 520, current speed of the non-active input shaft may be indicated via input shaft speed sensor(s) (e.g. 277), for example. Furthermore, the synchronous speed of the desired gear may comprise a value stored at the vehicle controller, for example. Still further engine speed may be indicated via an engine position sensor (e.g. 118B), for example.

If, at 520, it is indicated that the non-active input shaft speed is greater than the synchronous shaft speed of the desired gear, and further indicated that both the non-active input shaft speed and the synchronous shaft speed of the desired gear are greater than engine speed, method 500 may proceed to 525. Briefly, such a situation may comprise a condition as depicted above at FIG. 4A, described above. Accordingly, at 525, method 500 may include indicating whether adaptation of the DCT clutch transfer function for the current non-active shaft is desired. For example, adaptation of the DCT clutch may be desired responsive to a predetermined time elapsing since a previous DCT clutch adaptation procedure for the clutch responsible for transferring engine torque to the current non-active shaft. Adaptation of the DCT clutch may be further desired in some examples, responsive to an indication that a capacity of the clutch responsible for transferring engine torque to the current non-active shaft is not correct. In other examples, adaptation of the clutch responsible for transferring engine torque to the current non-active input shaft may follow a predetermined schedule determined by the vehicle controller.

If, at 525, it is indicated that adaptation of the DCT clutch responsible for transferring torque to the current non-active input shaft is not desired, method 500 may proceed to 535. At 535, method 500 may include changing the speed of the current non-active input shaft via engaging the appropriate synchronizer for the desired gear. In other words, instead of applying capacity to the clutch responsible for transferring engine torque to the transmission to change the speed of the non-active input shaft to the synchronous speed of the desired gear, as discussed above at FIG. 4A, method 500 may include recruiting the appropriate synchronizer to change the speed of the non-active input shaft. Responsive to changing speed of the non-active input shaft via the appropriate synchronizer, method 500 may return to 505 and may include continuing to determine the desired gear for the non-active input shaft.

Returning to 525, if it is indicated that adaptation of the DCT clutch responsible for transferring torque to the current non-active shaft is desired, method 500 may proceed to 530. At 530, method 500 may include indicating if there is sufficient ISG charge torque available. More specifically, in an example where non-active input shaft speed is greater than the synchronous shaft speed of the desired gear, and where both the non-active input shaft speed and synchronous shaft speed of the desired gear are greater than engine speed, in some examples positive torque may be transmitted to the engine. In a case where the vehicle is transmitting torque from the engine to the transmission via an active shaft (in a case where the clutch responsible for transferring engine torque to the transmission is at least partially closed), then the positive torque may serve to accelerate the vehicle unless the positive torque transmitted to the engine is offset by an ISG charging torque (e.g. negative torque provided via the ISG). In such an example, it may be understood that the vehicle is not operating in an electric-only mode, but instead is operating with a clutch responsible for transmitting engine torque to the transmission as least partially closed, as discussed above. Thus, at 530, determining whether sufficient charge torque is available may be a function of a prediction of how much positive torque may be transferred to the engine as a result of slowing the non-active input shaft speed down via applying capacity to the appropriate clutch. For example, in a case where first gear (e.g. 320) is selected on the non-active shaft, and a desired gear is seventh gear (e.g. 332), then more ISG charge torque may be desired, as compared to a case where first gear (e.g. 320) is selected on the non-active shaft, and a desired gear is fifth gear (e.g. 328), since more positive torque may be transferred to the engine in the case where the non-active shaft speed goes from a first gear synchronous speed to a seventh gear synchronous speed. In some examples, determining whether sufficient charge torque is available may be a function of how much capacity is desired to apply to the clutch responsible for transferring torque between the engine and the non-active input shaft.

Still further, at 530, determining whether sufficient ISG charge torque is available may be a function of a level of energy storage at the electric energy storage device (e.g. 132), for example. If, a level of energy storage is not greater than a threshold, it may be indicated that sufficient ISG charge torque is not available.

If, at 530, it is indicated that sufficient charge torque is not available for conducting the DCT clutch transfer function adaptation procedure, then method 500 may proceed to 535, and may include changing the speed of the non-active shaft by engaging the appropriate synchronizer, as discussed above. Responsive to changing the speed of the non-active shaft by engaging the appropriate synchronizer, method 500 may return to 505, where the desired transmission gear for the non-active shaft may be again determined.

Alternatively, if at 530 it is indicated that sufficient ISG charge torque is available, method 500 may proceed to FIG. 6, and may include conducting the negative DCT clutch adaptation procedure, as will be discussed in further detail below.

Returning to 520, responsive to an indication that the desired gear is different from the current gear selected on the non-active input shaft, and further responsive to an indication that the non-active input shaft speed is not greater than the synchronous speed of the desired gear and/or responsive to an indication that the current engine speed is greater than non-active input shaft speed and/or synchronous speed of the desired gear, method 500 may proceed to 540.

At 540, method 500 may include determining whether a current speed of the non-active input shaft is less than a synchronous speed of the desired gear, and may further include determining whether engine speed is greater than both the current speed of the non-active input shaft and the synchronous speed of the desired gear. As discussed above, current speed of the non-active input shaft may be indicated via input shaft speed sensor(s) (e.g. 277), and synchronous speed of the desired gear may comprise a value stored at the vehicle controller, for example. Still further engine speed may be indicated via an engine position sensor (e.g. 118B), for example.

If, at 540, it is indicated that engine speed is not greater than the non-active input shaft speed and the synchronous shaft speed of the desired gear, and/or that the non-active input shaft speed is not less than the synchronous shaft speed of the desired gear, then method 500 may proceed to 555. At 555, method 500 may include changing the non-active input shaft speed via engaging the appropriate synchronizer, as discussed above. Method 500 may then return to 505 and may include continuing to determine the desired transmission gear for the non-active input shaft.

Alternatively, if at 540, it is indicated that the engine speed is greater than both the synchronous shaft speed of the desired gear, and the current speed of the non-active input shaft, and that the current speed of the non-active input shaft speed is less than the synchronous shaft speed of the desired gear, method 500 may proceed to 545. At 545, method 500 may include indicating whether adaptation of the DCT clutch transfer function for the current non-active shaft is desired. As discussed above, adaptation of the DCT clutch may be desired responsive to a predetermined time elapsing since a previous DCT clutch adaptation procedure for the clutch responsible for transferring engine torque to the current non-active shaft. Adaptation of the DCT clutch may be further desired in some examples, responsive to an indication that a capacity of the clutch responsible for transferring engine torque to the current non-active shaft is not correct. In other examples, adaptation of the clutch responsible for transferring engine torque to the current non-active input shaft may follow a predetermined schedule determined by the vehicle controller.

If, at 545, it is indicated that adaptation of the DCT clutch responsible for transferring torque to the current non-active input shaft is not desired, method 500 may proceed to 555.

At 555, method 500 may include changing the speed of the current non-active input shaft via engaging the appropriate synchronizer for the desired gear. In other words, instead of applying capacity to the clutch responsible for transferring engine torque to the transmission to change the speed of the non-active input shaft to the synchronous speed of the desired gear, as discussed above at FIG. 4B, method 500 may include recruiting the appropriate synchronizer to change the speed of the non-active input shaft. Responsive to changing speed of the non-active input shaft via the appropriate synchronizer, method 500 may return to 505 and may include continuing to determine the desired gear for the non-active input shaft.

Returning to 545, if it is indicated that adaptation of the DCT clutch responsible for transferring torque to the current non-active shaft is desired, method 500 may proceed to 550. At 550, method 500 may include indicating if there is sufficient electric machine (e.g. 120) discharge torque available. More specifically, in an example where non-active input shaft speed is lower than the synchronous shaft speed of the desired gear, and where both the non-active input shaft speed and synchronous shaft speed of the desired gear are less than current engine speed, negative torque may be transmitted to the engine as the non-active input shaft speed is changed to the synchronous speed of the desired gear. In such an example, if the vehicle is transmitting torque from the engine to the transmission via a clutch associated with an active input shaft, then the negative torque transmitted to the engine via applying capacity to the clutch associated with the non-active input shaft may result in an undesired vehicle deceleration. Thus, to make up the difference, the electric machine (e.g. 120) downstream of the transmission may be recruited to provide positive torque to the wheels, to maintain the wheel torque at the level of wheel torque demanded via the vehicle operator. Thus, at 550, determining whether sufficient discharge torque is available may be a function of a prediction of how much negative torque may be transferred to the engine as a result of speeding up the non-active input shaft speed to via applying capacity to the appropriate clutch. As an example, in a case where seventh gear (e.g. 332) is selected on the non-active shaft, and a desired gear is third gear (e.g. 324), then more electric machine discharge torque may be desired, as compared to a case where seventh gear (e.g. 332) is selected on the non-active shaft, and a desired gear is fifth gear (e.g. 328), since more negative torque may be transferred to the engine in the case where the non-active shaft speed goes from a seventh gear synchronous speed to a third gear synchronous speed. In some examples, determining whether sufficient discharge torque is available may further be a function of the capacity desired to be applied to the input clutch responsible for transferring torque between the engine and the non-active input shaft.

Still further, at 550, determining whether sufficient electric machine discharge torque is available may be a function of a level of energy storage at the electric energy storage device (e.g. 132), for example. If, a level of energy storage is lower than a threshold, it may be indicated that sufficient electric machine discharge torque is not available.

If, at 550, it is indicated that sufficient discharge torque is not available for conducting the DCT clutch transfer function adaptation procedure, then method 500 may proceed to 555, and may include changing the speed of the non-active shaft by engaging the appropriate synchronizer, as discussed above. Responsive to changing the speed of the non-active shaft by engaging the appropriate synchronizer, method 500 may return to 505, where the desired transmission gear for the non-active shaft may be again determined.

Alternatively, if at 550 it is indicated that sufficient electric machine discharge torque is available, method 500 may proceed to FIG. 7, and may include conducting the positive DCT clutch adaptation procedure, as will be discussed in further detail below.

Turning now to FIG. 6, a high level example method 600 for conducting a negative DCT clutch adaptation procedure, is shown. More specifically, method 600 continues from method 500 depicted at FIG. 5, and includes adapting a transfer function, where the transfer function describes a relationship between a torque transfer capacity and a pressure applied to a clutch to provide the torque transfer capacity. Such a relationship may be described by a curve or a series of points that may be interpolated between. The transfer function may be adapted by replacing inaccurate values of the transfer function with more accurate values, for example.

As method 600 continues from FIG. 5, it may be understood that method 600 will be described with reference to the systems described herein and shown in FIGS. 1A-3, though it should be understood that similar methods may be applied to other systems without departing from the scope of this disclosure. Method 600 may be carried out by a controller, such as controller 12 in FIG. 1, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as ISG (e.g. 142), electric machine (e.g. 120), engine torque actuator(s) (e.g. 204), selector forks (e.g. 372, 376, 378, 382), first clutch actuator (e.g. 389), second clutch actuator (e.g. 387), etc., according to the method depicted below.

Method 600 begins at 605 and may include disengaging an appropriate synchronizer from a preselected gear, responsive to an indication that the desired gear for the non-active shaft is different than the preselected gear. Such an action may comprise the vehicle controller commanding the appropriate synchronizer disengaged via controlling a shift fork actuator (e.g. 388), such that a selector fork associated with the appropriate synchronizer may be controlled to disengage the preselected gear. In other words, at 605, method 600 may include controlling an appropriate synchronizer to disengage a selected gear that is transferring torque between the non-active input shaft and its corresponding layshaft of the transmission, prior to operating the non-active DCT clutch at a selected capacity, as will be discussed below.

Proceeding to 610, method 600 may include determining a desired DCT clutch capacity learning point. More specifically, determining the desired DCT clutch capacity learning point may include selecting an amount of pressure (e.g. hydraulic pressure) to supply to a clutch controlling transfer of torque from the engine to the transmission (and vice versa) for the non-active shaft. As discussed above, fluid flow supplied from a transmission pump (e.g. 312) to the appropriate clutch may be controlled via controlling an appropriate clutch valve actuator (e.g. 387, 389), the clutch valve actuator regulating a duty cycle of a pressure control valve (e.g. 387A, 389A). Thus, an amount of pressure supplied to the clutch may be a function of duty cycle of the appropriate pressure control valve, and power of the transmission pump. However, while such an example discusses the use of a wet-clutch, it may be understood that a dry-clutch may be utilized without departing from the scope of this disclosure. In other words, the methods and systems described herein may additionally apply to a dual clutch transmission comprising dry clutches.

In some examples, the desired DCT clutch capacity learning point may comprise a pressure value for which it has been indicated is not correct. In other examples, the desired DCT clutch capacity learning point may comprise a pressure value that is determined as a function of a schedule for DCT clutch adaptation stored at the vehicle controller. For example, a schedule for DCT clutch adaptation may first include a first pressure, then a second pressure, then a third pressure, etc., for each subsequent clutch adaptation procedure.

Responsive to determining the desired DCT capacity learning point at 610, method 600 may proceed to 615, and may include applying pressure to the non-active DCT clutch. In other words, as alluded to above, the amount of pressure determined at 610 may thus be applied to the clutch at 615, by actuating the appropriate clutch valve (e.g. 387A or 389A) via the appropriate clutch valve actuator (e.g. 387 or 389). In this way, capacity to the clutch responsible for transferring torque between the engine and transmission for the non-active input shaft may be increased to the desired capacity.

With clutch capacity increased as a function of the amount of fluid pressure supplied to the appropriate clutch, method 600 may proceed to 620. At 620, method 600 may include measuring speed of the non-active shaft while the speed is decreasing. More specifically, because the non-active input shaft speed associated with the selected gear was indicated to be higher than the desired input shaft speed for the desired gear, and both are greater than engine speed (as discussed at FIG. 5), the non-active input shaft speed may decrease as capacity to the appropriate clutch is increased. Thus, at 620, method 600 may include measuring a rate of change in the speed (e.g. RPM/sec) of the non-active input shaft. The rate of change in the speed of the non-active input shaft may be measured, for example, via input shaft speed sensor(s) (e.g. 277).

Proceeding to 625, method 600 may include estimating clutch torque capacity. More specifically, with the non-active shaft in neutral (e.g. synchronizers disengaged) as pressure is supplied to the appropriate clutch, non-active input shaft inertial torque may be calculated as a function of the rate of change (e.g. RPM/sec) of the non-active input shaft speed, and the shaft inertia. In this way, the clutch torque capacity may be estimated to equal the calculated non-active input shaft inertial torque, thus providing an estimate of clutch capacity at 625.

With clutch torque capacity estimated at 625, method 600 may proceed to 630. At 630, method 600 may include adapting the pressure to torque transfer function. More specifically, the torque transfer function may be adapted by replacing inaccurate values of the transfer function with more accurate values, based on the obtained clutch torque capacity estimate at 625. For example, the clutch capacity estimate may replace a torque value in the transfer function that corresponds to the clutch application pressure that resulted in the estimated clutch torque capacity value.

Proceeding to 635, method 600 may include compensating for the DCT clutch capacity applied to the non-active input shaft. More specifically, as discussed above at FIG. 5, applying capacity to a clutch in order to slow down the speed of the non-active input shaft in order to adapt the transfer function, may result in positive torque being transmitted to the engine. In an example where the engine is off, no active compensation may be utilized as torque supplied by the decelerating non-active input shaft may not be capable of overcoming engine compression to crank the engine. Said another way, maintaining driver demanded wheel torque during adjusting or adapting values of the torque transfer function may comprise not changing torque output of an electric motor positioned in the driveline under conditions where the engine is off during adjusting values of the torque transfer function.

However, in a case where the engine is in operation, and furthermore in a case where engine torque is being transferred to the transmission via a clutch associated with the active input shaft (e.g. clutch associated with the active input shaft at least partially closed), the positive torque resulting from applying clutch capacity to the non-active shaft may result in undesired vehicle acceleration. For example, a gear associated with the active shaft may be engaged via is appropriate synchronizer of the DCT such that torque may be transferred between the active input shaft and its associated layshaft, and such a synchronizer may be maintained engaged with the gear associated with the active shaft during adjusting or adapting values of the torque transfer function of the clutch associated with the non-active input shaft. Thus, at 635, method 600 may include compensating for the capacity applied to the clutch associated with the non-active input shaft by providing a charging torque via the ISG. In other words, the ISG may absorb the positive torque that results from applying clutch capacity to the non-active shaft, such that driver demanded wheel torque is maintained substantially equivalent to actual wheel torque. Said another way, in an example where decreasing the speed of the first transmission input shaft to the desired speed increases engine torque, driver demanded wheel torque may be maintained during adjusting or adapting values of the torque transfer function via controlling torque output of an electric motor positioned in the driveline, where the electric motor is positioned upstream of the dual clutch transmission, and where the electric motor supplies a negative torque substantially equivalent to the increased engine torque.

Proceeding to 640, method 600 may include stopping applying capacity to the appropriate DCT clutch associated with the non-active input shaft responsive to measured input shaft speed being within a threshold speed of the synchronous speed of the desired gear. For example, a synchronous speed of the desired gear may be stored at the vehicle controller, and input shaft speed may be measured by an input shaft speed sensor(s) (e.g. 277). Responsive to the measured non-active input shaft speed being within a threshold speed of the synchronous speed of the desired gear, method 600 may include engaging the appropriate synchronizer to engage the desired gear. Said another way, at 640, method 600 may include fully opening the appropriate DCT clutch (e.g. clutch that was associated with the non-active input shaft) responsive to speed of the non-active input shaft being within a threshold speed of the desired speed, and engaging a desired gear via an appropriate synchronizer. Method 600 may then end.

Turning now to FIG. 7 a high level example method 700 for conducting a positive DCT clutch adaptation procedure, is shown. More specifically, method 700 continues from method 500 depicted at FIG. 5, and includes adapting a transfer function, where the transfer function describes a relationship between a torque transfer capacity and a pressure applied to a clutch to provide the torque transfer capacity. Such a relationship may be described by a curve or a series of points that may be interpolated between. The transfer function may be adapted by replacing inaccurate values of the transfer function with more accurate values, for example.

As method 700 continues from FIG. 5, it may be understood that method 700 will be described with reference to the systems described herein and shown in FIGS. 1A-3, though it should be understood that similar methods may be applied to other systems without departing from the scope of this disclosure. Method 700 may be carried out by a controller, such as controller 12 in FIG. 1A, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as ISG (e.g. 142), electric machine (e.g. 120), engine torque actuator(s) (e.g. 204), selector forks (e.g. 372, 376, 378, 382), first clutch actuator (e.g. 389), second clutch actuator (e.g. 387), etc., according to the method depicted below.

Method 700 begins at 705 and may include disengaging the synchronizer from the preselected gear, responsive to an indication that the desired gear for the non-active shaft is different than preselected gear. As discussed above, such an action may comprise the vehicle controller commanding the appropriate synchronizer disengaged via controlling a shift fork actuator (e.g. 388), such that a selector fork associated with the appropriate synchronizer may be controlled to disengage the preselected gear.

Proceeding to 710, method 700 may include determining a desired DCT clutch capacity learning point. More specifically, determining the desired DCT clutch capacity learning point may include selecting an amount of pressure (e.g. hydraulic pressure) to supply to a clutch controlling transfer of torque from the engine to the transmission (and vice versa) for the non-active shaft. As discussed above, fluid flow supplied from a transmission pump (e.g. 312) to the appropriate clutch may be controlled via controlling an appropriate clutch valve actuator (e.g. 387, 389), the clutch valve actuator regulating a duty cycle of a pressure control valve (e.g. 387A, 389A). Thus, an amount of pressure supplied to the clutch may be a function of duty cycle of the appropriate pressure control valve, and power of the transmission pump. However, as discussed above, the methods and systems discussed herein may apply to a dual clutch transmission with a dry-clutch, without departing from the scope of this disclosure.

In some examples, the desired DCT clutch capacity learning point may comprise a pressure value for which it has been indicated is not correct. In other examples, the desired DCT clutch capacity learning point may comprise a pressure value that is determined as a function of a schedule for DCT clutch adaptation stored at the vehicle controller. For example, a schedule for DCT clutch adaptation may first include a first pressure, then a second pressure, then a third pressure, etc., for each subsequent clutch adaptation procedure.

Responsive to determining the desired DCT capacity learning point at 710, method 700 may proceed to 715, and may include applying pressure to the non-active DCT clutch. In other words, as alluded to above, the amount of pressure determined at 710 may thus be applied to the clutch at 715, by actuating the appropriate clutch valve (e.g. 387A or 389A) via the appropriate clutch valve actuator (e.g. 387 or 389). In this way, capacity to the clutch responsible for transferring torque between the engine and transmission for the non-active input shaft may be increased.

With clutch capacity increased as a function of the amount of fluid pressure supplied to the appropriate clutch, method 700 may proceed to 720. At 720, method 700 may include measuring speed of the non-active shaft while the speed is increasing. More specifically, because the non-active input shaft speed associated with the selected gear was indicated to be lower than the desired input shaft speed for the desired gear, and both are lower than engine speed (as discussed at FIG. 4B and FIG. 5), the non-active input shaft speed may increase as capacity to the appropriate clutch is increased. Thus, at 720, method 700 may include measuring a rate of change (e.g. RPM/sec) in the speed of the non-active input shaft. The rate of change in the speed of the non-active input shaft may be measured, for example, via input shaft speed sensor(s) (e.g. 277).

Proceeding to 725, method 700 may include estimating clutch torque capacity. More specifically, with the non-active shaft in neutral (e.g. synchronizers disengaged) as pressure is supplied to the appropriate clutch, non-active input shaft inertial torque may be calculated as a function of the rate of change (e.g. RPM/sec) of the non-active input shaft speed, and the shaft inertia. In this way, the clutch torque capacity may be estimated to equal the calculated non-active input shaft inertial torque, thus providing an estimate of clutch capacity at 725.

With clutch torque capacity estimated at 725, method 700 may proceed to 730. At 730, method 700 may include adapting the pressure to torque transfer function. More specifically, the torque transfer function may be adapted by replacing inaccurate values of the transfer function with more accurate values, based on the obtained clutch torque capacity estimate at 725. For example, the clutch capacity estimate may replace a torque value in the transfer function that corresponds to the clutch application pressure that resulted in the estimated clutch torque capacity value.

Proceeding to 735, method 700 may include compensating for the DCT clutch capacity applied to the non-active input shaft. More specifically, as discussed above at FIG. 5, applying capacity to a clutch in order to increase the speed of the non-active input shaft in order to adapt the transfer function, may result in negative torque being transmitted to the engine. For example, in a case where engine torque is being transferred to the transmission via a clutch associated with the active input shaft (e.g. clutch associated with the active input shaft at least partially closed), such as that described at FIG. 4B, the negative torque resulting from applying clutch capacity to the non-active shaft may result in undesired vehicle deceleration. For example, a gear associated with the active shaft may be engaged via is appropriate synchronizer of the DCT such that torque may be transferred between the active input shaft and its associated layshaft, and such a synchronizer may be maintained engaged with the gear associated with the active shaft during adjusting or adapting values of the torque transfer function of the clutch associated with the non-active input shaft. Thus, at 735, method 700 may include compensating for the capacity applied to the clutch associated with the non-active input shaft by providing a discharge torque via the electric machine (e.g. 120). In other words, the electric machine may be used to offset the negative torque that results from applying clutch capacity to the non-active shaft, such that driver demanded wheel torque is maintained substantially equivalent to actual wheel torque.

Said another way, at 735, increasing speed of the first transmission input shaft to the desired speed may decrease engine torque. In such an example, driver demanded wheel torque may be maintained during adjusting or adapting values of the torque transfer function via controlling torque output of an electric machine positioned downstream of the dual clutch transmission, where the torque output of the electric machine may comprise a positive torque substantially equivalent to the decreased engine torque.

As discussed above, in an example where the engine is off, maintaining driver demanded wheel torque during adjusting or adapting values of the torque transfer function may comprise not changing torque output of an electric motor positioned in the driveline under conditions where the engine is off during adjusting values of the torque transfer function.

Proceeding to 740, method 700 may include stopping applying capacity to the appropriate DCT clutch associated with the non-active input shaft responsive to measured input shaft speed being within a threshold speed of the synchronous speed of the desired gear. For example, a synchronous speed of the desired gear may be stored at the vehicle controller, and input shaft speed may be measured by an input shaft speed sensor(s) (e.g. 277). Responsive to the measured non-active input shaft speed being within a threshold speed of the synchronous speed of the desired gear, method 700 may include engaging the appropriate synchronizer to engage the desired gear. Method 700 may then end.

Turning now to FIG. 8, an example timeline 800 is shown for conducting a negative DCT clutch adaptation procedure, according to the methods described herein and with reference to FIGS. 5-6, and as applied to the systems described herein and with reference to FIGS. 1A-3. Timeline 800 includes plot 805, indicating a speed (RPM) of a non-active input shaft of a dual clutch transmission, and plot 810, indicating a desired speed of the non-active input shaft, over time. Timeline 800 further includes plot 815, indicating an engine speed, over time. Timeline 800 further includes plot 820, indicating a status of a clutch responsible for transferring torque between the engine and the non-active input shaft, over time. Timeline 800 further includes plot 825, indicating a status of a clutch responsible for transferring torque between an engine and an active input shaft, over time. For plots 820 and 825, clutch status may comprise an open clutch, a closed clutch, or a clutch somewhere in between open and closed (e.g. partially closed). It may be understood that an "open" clutch comprises a clutch with zero torque capacity, while "closed" may refer to a maximum clutch capacity. Between open and closed may refer to a capacity such that the clutch is partially closed, for example. Timeline 800 further includes plot 830, indicating a status of a synchronizer for engaging a desired gear on the non-active input shaft, and plot 835, indicating a status of a synchronizer for engaging a gear on the active input shaft, over time. Timeline 800 further includes plot 840, indicating torque output from an integrated starter/generator (e.g. ISG 142) upstream of the dual clutch transmission. The ISG may apply a positive (+) torque to the engine, a negative (−) torque to the engine, or no torque (0) to the engine.

At time t0, the vehicle is in operation, with the engine operating to propel the vehicle, indicating by plot 815. More specifically, a clutch responsible for transferring torque between the engine and an active input shaft, is substantially closed, illustrated by plot 825. Thus, it may be understood that engine torque is being transferred to the active input shaft via the clutch responsible for transferring torque between the engine and the active shaft. A synchronizer on the active shaft is engaging a selected gear, indicated by plot 835. Furthermore, the ISG is not providing positive or negative torque to the driveline, indicated by plot 840.

Still further, a synchronizer on the non-active shaft is engaging a selected gear on the non-active shaft, illustrated by plot 830, however the clutch responsible for transferring torque from the engine to the non-active shaft is open, illustrated by plot 820. Thus, with the clutch open, it may be understood that no torque is being transferred from the engine to non-active input shaft, and vice versa.

At time t1, a shift to a new desired gear on the non-active shaft is indicated. Accordingly, a desired speed of the non-active input shaft is determined, illustrated by plot 810. More specifically, the desired speed of the non-active input shaft may comprise a synchronous speed of the non-active shaft defined by the new desired gear. At the time of the desired gear shift for the non-active input shaft, speed of the non-active input shaft is greater than the desired speed of the non-active input shaft, and both are greater than engine speed. Thus, as discussed above at FIG. 6, such a condition may allow for a negative DCT clutch adaptation procedure.

Accordingly, at time t1, the synchronizer engaged on the selected gear on the non-active shaft is commanded via the vehicle controller to disengage. By disengaging the synchronizer on the non-active shaft, it may be understood that the non-active shaft is in a neutral condition. Furthermore, the clutch responsible for transferring torque between the engine and transmission via the non-active shaft, is open.

At time t2, the clutch responsible for transferring torque between the engine and the transmission via the non-active input shaft, is commanded to a predetermined capacity. More specifically, as discussed above at FIG. 6, responsive to an indication of a desired shift from a selected gear to a desired gear, where a negative DCT clutch adaptation procedure may be conducted, a desired learning point, or desired clutch capacity, may be selected. In other words, an amount of pressure (e.g. hydraulic pressure) to supply to the clutch controlling transfer of torque between the engine and non-active input shaft of the transmission, may be selected. In some examples, the desired DCT clutch capacity learning point may comprise a pressure value for which it has been indicated is not correct. Additionally or alternatively, in some examples, the learning point, or desired clutch capacity, may comprise a pressure value that is determined as a function of a schedule for DCT clutch adaptation stored at the vehicle controller. Accordingly, at time t2 the clutch responsible for transferring torque between the engine and the transmission, is closed to the predetermined clutch capacity, illustrated by plot 820.

With clutch capacity commanded to the desired learning point at time t2, speed of the non-active input shaft is illustrated to decrease between time t2 and t3. More specifically, because the non-active shaft was spinning at a level higher than the desired speed for the non-active shaft, and because engine speed is below the desired speed for the non-active shaft, applying the predetermined capacity to the clutch may result in the non-active shaft decreasing speed. However, during time t2 and t3, the synchronizer engaging the selected gear on the active shaft remains engaged, and the clutch responsible for transferring torque between the engine and the active input shaft, remains substantially closed, illustrated by plot 825. Because the engine is operating and transferring engine torque to the active shaft, slowing the speed of the non-active input shaft by applying clutch capacity may result in a positive torque being communicated to the engine. Thus, to offset the positive torque transmitted to the engine, the ISG is commanded via the vehicle controller to apply a negative torque. It may be understood that the negative torque provided via the ISG may comprise a value of negative torque that may substantially offset any positive torque communicated to the engine via the slowing non-active input shaft. In some examples the amount of ISG negative torque may be based on the capacity commanded to the clutch, and/or the change in non-active input shaft speed from the current non-active input shaft speed to the desired non-active input shaft speed.

Furthermore, between time t2 and t3, the rate of change (e.g. RPM/sec) in the speed of the non-active shaft may be measured, as discussed above at FIG. 6, via an input shaft speed sensor (e.g. 277). By measuring the rate of change of speed of the non-active shaft between time t2 and t3, non-active input shaft inertial torque may be calculated as a function of the rate of change of the non-active input shaft speed, and the shaft inertia. Thus, between time t2 and t3, clutch torque capacity may be estimated to equal the calculated non-active input shaft inertial torque. In this way, the pressure to torque transfer function may be adapted. In other words, the torque transfer function may be adapted by replacing inaccurate values of the transfer function with more accurate values, where in this case the more accurate value for clutch capacity includes the estimated clutch torque capacity value determined between time t2 and t3, as a result of conducting the negative DCT clutch adaptation procedure.

At time t3, it is indicated that the speed of the non-active input shaft is within a threshold of the desired speed. Accordingly, at time t3 the clutch responsible for transferring torque between the engine and non-active input shaft is commanded to an open state, indicated by plot 820. With the clutch responsible for transferring torque between the engine and the non-active input shaft open, the synchronizer on the non-active shaft engages the desired gear on the non-active shaft. While in example timeline 800 it is illustrated that the same synchronizer engages a selected gear prior to the shift, and the desired gear as a result of the shift, it may be understood that such an example is for simplicity. In some examples, a different synchronizer on the non-active shaft may be recruited by the vehicle controller to engage the desired gear.

Furthermore, at time t3, as the clutch responsible for transferring torque between the engine and the non-active input shaft is commanded open, negative toque provided via the ISG is no longer needed to compensate for positive torque being communicated to the engine. Thus, at time t3, the ISG torque is reduced from the negative value to zero, or an off state.

Thus, with the desired gear engaged via the appropriate synchronizer at time t4, between time t4 and t5 the vehicle is operated with the clutch responsible for transferring torque between the engine and the non-active input shaft in an open state, the clutch responsible for transferring torque between the engine and the active input shaft in a substantially closed configuration, and the ISG in an off state. Furthermore, the selected gear on the active input shaft remains engaged via its appropriate synchronizer, illustrated by plot 835, while the desired gear on the non-active input shaft remains engaged via its appropriate synchronizer, illustrated by plot 830.

Turning now to FIG. 9, an example 900 is shown for conducting a positive DCT clutch adaptation procedure, according to the methods described herein and with reference to FIG. 7, and as applied to the systems described herein and with reference to FIGS. 1A-3. Timeline 900 includes plot 905, indicating a speed (RPM) of an engine, over time. Timeline 900 further includes plot 910, indicating a desired speed of a non-active input shaft of a dual clutch transmission, and plot 915, indicating a current speed of the non-active input shaft, over time. Timeline 900 further includes plot 920, indicating a status of a clutch responsible for transferring torque between the engine and the non-active input shaft, over time. Timeline 900 further includes plot 925, indicating a status of a clutch responsible for transferring torque between the engine and an active input shaft, over time. For plots 920 and 925, clutch status may comprise an open clutch, a closed clutch, or a clutch capacity somewhere in between open and closed (e.g. partially closed). It may be understood that an "open" clutch comprises a clutch with zero torque capacity, while "closed" may refer to a maximum clutch capacity. Between open and closed may refer to a capacity such that the clutch is partially closed, for example. Timeline 900 further includes plot 930, indicating a status of a synchronizer for engaging a gear on the non-active input shaft, and plot 935, indicating a status of a synchronizer for engaging a gear on the active input shaft, over time. Timeline 900 further includes plot 940, indicating torque output from an electric machine (e.g. 120) positioned in the driveline downstream of the dual clutch transmission, over time. The electric machine may apply a positive (+) torque to the driveline, a negative (−) torque to the driveline, or no torque (0).

At time t0, the vehicle is in operation, with the engine operating to propel the vehicle, indicated by plot 905. More specifically, the clutch responsible for transferring torque between the engine and the active input shaft, is substantially closed, illustrated by plot 925. Thus, it may be understood that engine torque is being transferred to the active input shaft via the clutch responsible for transferring torque between the engine and the active input shaft. A synchronizer on the active shaft is engaging a selected gear, indicated by plot 935. Furthermore, the electric machine is not providing positive or negative torque to the driveline, indicated by plot 840.

Still further, a synchronizer on the non-active shaft is engaging a selected gear on the non-active shaft, illustrated by plot 930, however the clutch responsible for transferring torque from the engine to the non-active shaft is open, illustrated by plot 920. Thus, with the clutch open, it may be understood that no torque is being transferred from the engine to non-active input shaft, and vice versa.

At time t1, a shift to a new desired gear on the non-active shaft is indicated. Accordingly, a desired speed of the non-active input shaft is determined, illustrated by plot 910. More specifically, the desired speed of the non-active input shaft may comprise a synchronous speed of the non-active shaft defined by the new desired gear. At the time of the desired gear shift for the non-active input shaft, speed of the non-active input shaft is lower than the desired speed of the non-active input shaft, and both are lower than engine speed. Thus, as discussed above at FIG. 7, such a condition may allow for a positive DCT clutch adaptation procedure.

Accordingly, at time t1, the synchronizer engaged on the selected gear on the non-active input shaft is commanded via the vehicle controller to disengage. By disengaging the synchronizer on the non-active input shaft, it may be understood that the non-active shaft is in a neutral condition. Furthermore, the clutch responsible for transferring torque between the engine and non-active input shaft, is open, illustrated by plot 920.

At time t2, the clutch responsible for transferring torque between the engine and the transmission via the non-active input shaft, is commanded to a predetermined capacity. More specifically, as discussed above at FIG. 7, responsive to an indication of a desired shift from a selected gear to a desired gear, where a positive DCT clutch adaptation procedure may be conducted, a desired learning point, or desired clutch capacity, may be selected. In other words, amount of pressure (e.g. hydraulic pressure) to supply to the clutch controlling transfer of torque between the engine and non-active input shaft of the transmission, may be selected. In some examples, the desired DCT clutch capacity learning point may comprise a pressure value for which is has been indicated is not correct. Additionally or alternatively, in some examples, the learning point, or desired clutch capacity, may comprise a pressure value that is determined as a function of a schedule for DCT clutch adaptation stored at the vehicle controller. Accordingly, at time t2 the clutch responsible for transferring torque between the engine and the transmission, is closed to the predetermined clutch capacity, illustrated by plot 920.

With clutch capacity commanded to the learning point at time t2, speed of the non-active input shaft is illustrated to increase between time t2 and t3. More specifically, because the non-active input shaft was spinning at a level lower than the desired speed for the non-active input shaft, and because engine speed is higher than the desired speed for the non-active input shaft, applying the predetermined capacity to the clutch may result in the non-active shaft increasing speed. However, during time t2 and t3, the synchronizer engaging the selected gear on the active shaft remains engaged, and the clutch responsible for transferring torque between the engine and the active shaft remains substantially closed, illustrated by plot 925. Because the engine is operating and transferring engine torque to the active shaft, increasing the speed of the non-active input shaft by applying clutch capacity may result in a negative torque being communicated to the driven wheels. Thus, to offset the negative torque, which may result in vehicle hesitation, the electric machine (e.g. 120) is commanded via the vehicle controller to apply a positive torque to the driven wheels. It may be understood that the positive torque provided via the electric machine may comprise a value of positive torque that may substantially offset any negative torque communicated to the driven wheels resulting from increasing the speed of the non-active input shaft. In some examples the amount of electric machine torque provided to the driven wheels may be based on the capacity commanded to the clutch responsible for transferring torque between the engine and the non-active input shaft, and/or change in non-active input shaft speed from the current non-active input shaft speed to the desired non-active input shaft speed.

Furthermore, between time t2 and t3, the rate of change in the speed of the non-active shaft may be measured, as discussed above at FIG. 7, via an input shaft speed sensor (e.g. 277). By measuring the rate of change of speed of the non-active input shaft between time t2 and t3, non-active input shaft inertial torque may be calculated as a function of the rate of change of the non-active input shaft speed, and the shaft inertia. Thus, between time t2 and t3, clutch torque capacity may be estimated to equal the calculated non-active input shaft inertial torque. In this way, the pressure to torque transfer function may be adapted. In other words, the torque transfer function may be adapted by replacing inaccurate values of the transfer function with more accurate values, where in this case the more accurate value for clutch capacity includes the estimated clutch torque capacity value determined between time t2 and t3, as a result of conducting the positive DCT clutch adaptation procedure.

At time t3, it is indicated that the speed of the non-active input shaft is within a threshold of the desired speed. Accordingly, at time t3 the clutch responsible for transferring torque between the engine and non-active input shaft is commanded to an open state, indicated by plot 920. With the clutch responsible for transferring torque between the engine and the non-active input shaft open, the synchronizer on the non-active shaft engages the desired gear on the non-active shaft. While in example timeline 900 it is illustrated that the same synchronizer engages a selected gear prior to the shift, and the desired gear as a result of the shift, it may be understood that such an example is for simplicity. In some examples, a different synchronizer on the non-active shaft may be recruited by the vehicle controller to engage the desired gear.

Furthermore, at time t3, as the clutch responsible for transferring torque between the engine and the non-active input shaft is commanded open, torque provided to the driven wheels via the electric machine is no longer needed to compensate for negative torque being communicated to the wheel as a result of conducting the positive DCT clutch adaptation procedure. Thus, at time t3, the electric machine torque is reduced from the positive value to zero, or an off state.

Thus, with the desired gear engaged via the appropriate synchronizer at time t4, between time t4 and t5 the vehicle is operated with the clutch responsible for transferring torque between the engine and the non-active input shaft in an open state, the clutch responsible for transferring torque between the engine and the active input shaft in a substantially closed configuration, and the electric machine in an off state. Furthermore, the selected gear on the active input shaft remains engaged via its appropriate synchronizer, illustrated by plot 935, while the desired gear on the non-active input shaft remains engaged via its appropriate synchronizer, illustrated by plot 930.

In this way, the methods described herein enable the possibility to adapt both positive and negative torque transfer functions in ways that are non-intrusive to vehicle operations. In a vehicle system such as that described herein and with regard to FIGS. 1A-3, non-active input shafts of a dual clutch transmission may undergo frequent, and in some cases large, shifts. Such shift events present unique opportunities to conduct both positive and negative torque transfer function adaptation procedures. By conducting both positive and negative torque transfer function adaptation procedures in such a vehicle, shift quality and connection of the engine to the transmission smoothly and quickly responsive to engine torque being demanded, may be improved.

The technical effect is to recognize that in a vehicle system such as that described herein and with regard to FIGS. 1A-3, both positive and negative torque transfer functions may be adapted by controlling a speed of a non-active input shaft to a desired speed by commanding capacity to an appropriate clutch to either speed up or slow down the non-active input shaft speed to the desired speed. By monitoring a rate of change of speed, a pressure to torque transfer function may be adapted. A further technical effect is to recognize that driveline disturbances may be compensated for during the clutch adaptation procedures via using either an integrated starter generator (ISG) positioned upstream of the dual clutch transmission, or an electric machine positioned downstream of the transmission. For example, during a negative DCT clutch adaptation procedure, positive torque may be communicated to the engine, and if the engine is in operation and transferring torque to an active input shaft of the transmission, such positive torque may serve to accelerate the vehicle in a manner undesired by the vehicle operator. Accordingly, an additional load in the form of a negative torque may be contributed via the ISG, to prevent undesired vehicle acceleration. Similarly, during a positive DCT clutch adaptation procedure, negative torque may be communicated to the driven wheels, which may serve to undesirably slow the vehicle. Accordingly, as the electric machine is positioned downstream of the dual clutch transmission, the electric machine may be able to be utilized to maintain wheel torque at the desired wheel torque while the non-active input shaft is being changed to the engage the desired gear.

The systems described herein, and with reference to FIGS. 1A-3, along with the methods described herein, and with reference to FIGS. 5-7, may enable one or more systems and one or more methods. In one example, a driveline operating method for a vehicle comprises operating a first clutch of a dual clutch transmission at a selected capacity to change a speed of a first transmission input shaft to a desired speed; adjusting values of a torque transfer function of the first clutch based on a rate of the speed change; and maintaining driver demanded wheel torque during the adjusting via controlling torque output of an electric motor positioned in the driveline. In a first example of the method, the method further includes wherein changing speed of the first transmission input shaft to the desired speed includes decreasing speed of the first transmission input shaft to the desired speed responsive to transmission input shaft speed being greater than the desired speed, and further responsive to a speed of a combustion engine positioned upstream of the transmission being lower than the desired speed; and wherein changing speed of the first transmission input shaft to the desired speed includes increasing speed of the first transmission input shaft to the desired speed responsive to transmission input shaft speed being lower than the desired speed, and further responsive to engine speed being greater than the desired speed. A second example of the method optionally includes the first example, and further comprises controlling a first synchronizer to disengage a first selected gear that is transferring torque between the first input shaft and a first layshaft of the transmission prior to operating the first clutch at the selected capacity; fully opening the first clutch responsive to speed of the first transmission input shaft being within a threshold speed of the desired speed; and engaging a desired gear via the first synchronizer or a second synchronizer. A third example of the method optionally includes any one or more or each of the first and second examples, and further includes wherein decreasing the speed of the first transmission input shaft to the desired speed increases engine torque; and wherein maintaining driver demanded wheel torque during the adjusting via controlling torque output of an electric motor positioned in the driveline further comprises supplying a negative torque substantially equivalent to the increased engine torque via the electric motor, where the electric motor is positioned upstream of the dual clutch transmission. A fourth example of the method optionally includes any one or more or each of the first through third examples and further includes wherein increasing the speed of the first transmission input shaft to the desired speed decreases engine torque; and wherein maintaining driver demanded wheel torque during the adjusting via controlling torque output of an electric motor positioned in the driveline further comprises supplying a positive torque substantially equivalent to the decreased engine torque, via the electric motor, where the electric motor is an electric machine positioned downstream of the dual clutch transmission. A fifth example of the method optionally includes any one or more or each of the first through fourth examples and further includes wherein maintaining driver demanded wheel torque during the adjusting via controlling torque output of an electric motor further comprises not changing torque output of the electric motor under conditions where the engine is off during the adjusting values of the torque transfer function. A sixth example of the method optionally includes any one or more or each of the first through fifth examples and further comprises controlling a third synchronizer of the dual clutch transmission to engage a second selected gear to transfer torque between the second input shaft and a second layshaft of the transmission; and maintaining the second input shaft synchronizer engaged with the second selected gear during the adjusting values of the torque transfer function of the first clutch. A seventh example of the method optionally includes any one or more or each of the first through sixth examples and further comprises transferring torque between the engine and the transmission via controlling a capacity of a second clutch of the dual clutch transmission; and wherein torque transfer between the engine and the transmission as controlled by the second clutch is maintained during the adjusting responsive to the engine combusting air and fuel by the second clutch being at least partially closed, but wherein no transfer of torque between the engine and the transmission occurs in response to the engine being off during the adjusting by the second clutch being fully opened. An eighth example of the method optionally includes any one or more or each of the first through seventh examples and further includes wherein the selected capacity comprises a desired learning point for the adjusting of values of the torque transfer function; and includes an amount of pressure to supply to the first clutch to control clutch capacity to the selected capacity. A ninth example of the method optionally includes any one or more or each of the first through eighth examples and further includes wherein adjusting values of the torque transfer function of the first clutch based on the rate of speed change of the first input shaft further comprises determining first input shaft inertial torque as a function of rate of change of first input shaft speed, and first input shaft inertia.

An example of a system for a vehicle comprises a dual clutch transmission with a first input shaft, a first input shaft clutch, a first layshaft, odd gears removably coupled to the first input shaft, a second input shaft, a second input shaft clutch, a second layshaft, even gears removably coupled to the second input shaft, and a plurality of synchronizers; an engine positioned upstream of the dual clutch transmission; an electric motor positioned upstream of the dual clutch transmission; an electric machine positioned downstream of the dual clutch transmission; an engine speed sensor; a first input shaft speed sensor and a second input shaft speed sensor; and a controller, storing instructions in non-transitory memory, that when executed, cause the controller to: in response to conditions being met for adapting a dual clutch transmission pressure to torque transfer function, disengage a first synchronizer from a first gear transferring torque between the first input shaft and the first layshaft, apply a desired capacity to the first clutch to change a speed of the first input shaft to a desired speed, monitor a rate of change of speed of the first input shaft during the applying the desired capacity to the first clutch, adjust values of the torque transfer function of the first clutch based on the rate of speed change and first input shaft inertia; and maintain driver demanded wheel torque during adjusting the values of the torque transfer function. In a first example of the system, the system further includes wherein conditions being met for adapting the dual clutch transmission pressure to torque transfer function include the desired speed lower than first input shaft speed, and wherein engine speed is lower than the desired speed, or where desired speed is higher than first input shaft speed, and wherein engine speed is higher than desired speed. A second example of the system optionally includes the first example, and further comprises additional instructions to maintain driver demanded wheel torque via providing a negative torque via the electric motor positioned upstream of the dual clutch transmission under conditions where the desired speed is lower than the first input shaft speed, and where the engine is in operation. A third example of the system optionally includes any one or more or each of the first and second examples, and further comprises additional instructions to maintain driver demanded wheel torque via providing a positive torque via the electric machine positioned downstream of the dual clutch transmission under conditions where the desired speed is greater than the first input shaft speed, and where the engine is in operation. A fourth example of the system optionally includes any one or more or each of the first through third examples and further comprises additional instructions to maintain the second clutch at least partially closed to transfer engine torque to the transmission while adjusting values of the torque transfer function of the first clutch. A fifth example of the system optionally includes any one or more or each of the first through fourth examples, and further comprises additional instructions to maintain a second synchronizer engaged with a second gear transferring torque between the second input shaft and the second layshaft while adjusting values of the torque transfer function of the first clutch. A sixth example of the system optionally includes any one or more or each of the first through fifth examples, and further comprises additional instructions to fully open the first clutch responsive to an indication that first input shaft speed is within a threshold speed of the desired speed; and select a desired gear that transfers torque between the first input shaft and the first layshaft via engaging a synchronizer with the desired gear.

Another example of a method comprises in a first condition, adjusting values of a pressure to torque transfer function of a first clutch of a dual clutch transmission by applying a desired capacity to the first clutch to decrease speed of a first input shaft of the dual clutch transmission to a first desired speed; in a second condition, adjusting values of the transfer function by applying the desired capacity or a second desired capacity to the first clutch to increase speed of the first input shaft to a second desired speed; and maintaining a desired wheel torque during the adjusting values of the transfer function in both the first and second conditions. In a first example of the method, the method further includes wherein an electric motor positioned upstream of the dual clutch transmission provides a negative torque during the adjusting during the first condition to maintain the desired wheel torque under conditions where an engine of the vehicle is combusting air and fuel; and wherein an electric machine positioned downstream of the dual clutch transmission provides a positive torque during the adjusting during the second condition to maintain the desired wheel torque under conditions where the engine of the vehicle is combusting air and fuel. A second example of the method optionally includes the first example, and further includes wherein in both the first condition and the second condition, configuring the first input shaft in a neutral state where torque is not transferred between the first input shaft and a first layshaft of the dual clutch transmission prior to applying a desired capacity to the first clutch; and in both the first and second condition, configuring the second input shaft to transfer torque between the second input shaft and a second layshaft of the dual clutch transmission, and where the second clutch is at least partially closed under conditions where the engine is combusting air and fuel.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method for a vehicle comprising:
operating a first clutch of a dual clutch transmission at a selected capacity to change a speed of a first transmission input shaft to a desired speed;
adjusting values of a torque transfer function of the first clutch based on a rate of the speed change; and
maintaining driver demanded wheel torque during the adjusting via controlling torque output of an electric motor positioned in the driveline.

2. The method of claim 1, wherein changing speed of the first transmission input shaft to the desired speed includes decreasing speed of the first transmission input shaft to the desired speed responsive to transmission input shaft speed being greater than the desired speed, and further responsive to a speed of a combustion engine positioned upstream of the transmission being lower than the desired speed; and wherein changing speed of the first transmission input shaft to the desired speed includes increasing speed of the first transmission input shaft to the desired speed responsive to transmission input shaft speed being lower than the desired speed, and further responsive to engine speed being greater than the desired speed.

3. The method of claim 2, further comprising:
controlling a first synchronizer to disengage a first selected gear that is transferring torque between the first input shaft and a first layshaft of the transmission prior to operating the first clutch at the selected capacity;
fully opening the first clutch responsive to speed of the first transmission input shaft being within a threshold speed of the desired speed; and
engaging a desired gear via the first synchronizer or a second synchronizer.

4. The method of claim 2, wherein decreasing the speed of the first transmission input shaft to the desired speed increases engine torque; and
wherein maintaining driver demanded wheel torque during the adjusting via controlling torque output of an electric motor positioned in the driveline further comprises supplying a negative torque substantially equivalent to the increased engine torque via the electric motor, where the electric motor is positioned upstream of the dual clutch transmission.

5. The method of claim 2, wherein increasing the speed of the first transmission input shaft to the desired speed decreases engine torque; and
wherein maintaining driver demanded wheel torque during the adjusting via controlling torque output of an electric motor positioned in the driveline further comprises supplying a positive torque substantially equivalent to the decreased engine torque, via the electric motor, where the electric motor is an electric machine positioned downstream of the dual clutch transmission.

6. The method of claim 2, wherein maintaining driver demanded wheel torque during the adjusting via controlling torque output of an electric motor further comprises not changing torque output of the electric motor under conditions where the engine is off during the adjusting values of the torque transfer function.

7. The method of claim 2, further comprising controlling a third synchronizer of the dual clutch transmission to engage a second selected gear to transfer torque between the second input shaft and a second layshaft of the transmission; and
maintaining the second input shaft synchronizer engaged with the second selected gear during the adjusting values of the torque transfer function of the first clutch.

8. The method of claim 2, further comprising transferring torque between the engine and the transmission via controlling a capacity of a second clutch of the dual clutch transmission; and
wherein torque transfer between the engine and the transmission as controlled by the second clutch is maintained during the adjusting responsive to the engine combusting air and fuel by the second clutch being at least partially closed, but wherein no transfer of torque between the engine and the transmission occurs in response to the engine being off during the adjusting by the second clutch being fully opened.

9. The method of claim 2, wherein the selected capacity comprises a desired learning point for the adjusting of values of the torque transfer function; and includes an amount of pressure to supply to the first clutch to control clutch capacity to the selected capacity.

10. The method of claim 2, wherein adjusting values of the torque transfer function of the first clutch based on the rate of speed change of the first input shaft further comprises determining first input shaft inertial torque as a function of rate of change of first input shaft speed, and first input shaft inertia.

11. A system for a vehicle comprising:
a dual clutch transmission with a first input shaft, a first input shaft clutch, a first layshaft, odd gears removably coupled to the first input shaft, a second input shaft, a second input shaft clutch, a second layshaft, even gears removably coupled to the second input shaft, and a plurality of synchronizers;
an engine positioned upstream of the dual clutch transmission;
an electric motor positioned upstream of the dual clutch transmission;
an electric machine positioned downstream of the dual clutch transmission;
an engine speed sensor;
a first input shaft speed sensor and a second input shaft speed sensor; and
a controller, storing instructions in non-transitory memory, that when executed, cause the controller to:
in response to conditions being met for adapting a dual clutch transmission pressure to torque transfer function, disengage a first synchronizer from a first gear transferring torque between the first input shaft and the first layshaft, apply a desired capacity to the first clutch to change a speed of the first input shaft to a desired speed, monitor a rate of change of speed of the first input shaft during the applying the desired capacity to the first clutch, adjust values of the torque transfer function of the first clutch based on the rate of speed change and first input shaft inertia; and
maintain driver demanded wheel torque during adjusting the values of the torque transfer function.

12. The system of claim 11, wherein conditions being met for adapting the dual clutch transmission pressure to torque transfer function include the desired speed lower than first input shaft speed, and wherein engine speed is lower than the desired speed, or where desired speed is higher than first input shaft speed, and wherein engine speed is higher than desired speed.

13. The system of claim 11, further comprising additional instructions to maintain driver demanded wheel torque via providing a negative torque via the electric motor positioned upstream of the dual clutch transmission under conditions where the desired speed is lower than the first input shaft speed, and where the engine is in operation.

14. The system of claim 11, further comprising additional instructions to maintain driver demanded wheel torque via providing a positive torque via the electric machine positioned downstream of the dual clutch transmission under conditions where the desired speed is greater than the first input shaft speed, and where the engine is in operation.

15. The system of claim 11, further comprising additional instructions to maintain the second clutch at least partially closed to transfer engine torque to the transmission while adjusting values of the torque transfer function of the first clutch.

16. The system of claim 11, further comprising additional instructions to maintain a second synchronizer engaged with a second gear transferring torque between the second input shaft and the second layshaft while adjusting values of the torque transfer function of the first clutch.

17. The system of claim 11, further comprising additional instructions to fully open the first clutch responsive to an indication that first input shaft speed is within a threshold speed of the desired speed; and
- select a desired gear that transfers torque between the first input shaft and the first layshaft via engaging a synchronizer with the desired gear.

18. A method comprising:
- in a first condition, adjusting values of a pressure to torque transfer function of a first clutch of a dual clutch transmission by applying a desired capacity to the first clutch to decrease speed of a first input shaft of the dual clutch transmission to a first desired speed;
- in a second condition, adjusting values of the transfer function by applying the desired capacity or a second desired capacity to the first clutch to increase speed of the first input shaft to a second desired speed; and
- maintaining a desired wheel torque during the adjusting values of the transfer function in both the first and second conditions.

19. The method of claim 18, wherein an electric motor positioned upstream of the dual clutch transmission provides a negative torque during the adjusting during the first condition to maintain the desired wheel torque under conditions where an engine of the vehicle is combusting air and fuel; and
- wherein an electric machine positioned downstream of the dual clutch transmission provides a positive torque during the adjusting during the second condition to maintain the desired wheel torque under conditions where the engine of the vehicle is combusting air and fuel.

20. The method of claim 18, further comprising:
- in both the first condition and the second condition, configuring the first input shaft in a neutral state where torque is not transferred between the first input shaft and a first layshaft of the dual clutch transmission prior to applying a desired capacity to the first clutch; and
- in both the first and second condition, configuring the second input shaft to transfer torque between the second input shaft and a second layshaft of the dual clutch transmission, and where the second clutch is at least partially closed under conditions where the engine is combusting air and fuel.

* * * * *